United States Patent
Jain et al.

(10) Patent No.: US 10,210,142 B1
(45) Date of Patent: Feb. 19, 2019

(54) INSERTING LINKED TEXT FRAGMENTS IN A DOCUMENT

(71) Applicant: Adobe Systems Incorporated, San Jose, CA (US)

(72) Inventors: Sanyam Jain, New Delhi (IN); Ramnik Singh, Noida (IN); Pragya Kandari, Srinagar Garhwal (IN); Nitin Kumar, Bijnor (IN); Manohar Singh Gour, Nagaur (IN); Gaurav Bhargava, Noida (IN); Anshul Jain, Lalitpur (IN); Abhishek Raj, Bokaro Steel (IN); Abhinav Agarwal, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/825,395

(22) Filed: Nov. 29, 2017

(51) Int. Cl.
| | |
|---|---|
| *G06F 17/00* | (2006.01) |
| *G06F 17/22* | (2006.01) |
| *G06F 17/21* | (2006.01) |
| *G06F 17/30* | (2006.01) |

(52) U.S. Cl.
CPC ........ *G06F 17/2235* (2013.01); *G06F 17/212* (2013.01); *G06F 17/2229* (2013.01); *G06F 17/30014* (2013.01)

(58) Field of Classification Search
CPC .................................................. G06F 17/2229
See application file for complete search history.

(56) References Cited

U.S. PATENT DOCUMENTS

| | | | | |
|---|---|---|---|---|
| 6,154,757 A * | 11/2000 | Krause | ................. | G06F 3/0219 715/205 |
| 6,553,373 B2 * | 4/2003 | Boguraev | ............. | G06F 17/214 |
| 9,467,750 B2 * | 10/2016 | Banica | ................. | H04N 21/812 |
| 2005/0086134 A1 * | 4/2005 | Bar | ........ | G06Q 10/06 705/28 |
| 2007/0028162 A1 * | 2/2007 | Griffin | ................ | G06F 17/3089 715/235 |
| 2008/0148147 A1 * | 6/2008 | Poston | .............. | G06F 17/30716 715/273 |
| 2009/0178144 A1 * | 7/2009 | Redlich | ............... | G06F 21/6209 726/27 |
| 2010/0017700 A1 * | 1/2010 | Odean | ............... | G06F 17/30929 715/230 |
| 2010/0251143 A1 * | 9/2010 | Thomas | .............. | G06F 17/3089 715/760 |

(Continued)

*Primary Examiner* — Laurie A Ries
(74) *Attorney, Agent, or Firm* — Wolfe-SBMC

(57) ABSTRACT

In one or more implementations, a digital medium environment includes at least one computing device. Systems and techniques are described herein for inserting linked text fragments in a document layout of a document. By supporting multiple linked text fragments within a text frame, of both constant content and variable content, content of an asset is inserted into a text fragment while preserving the styling attributes of the text frame. Thus, manual efforts associated with reapplying styling attributes are avoided, unlike systems that do not distinguish between text fragments with constant content and text fragments with variable content within a text frame. Furthermore, a user interface is generated that exposes metadata of assets and a document layout. Content of an asset exposed via the user interface, once selected, is inserted into the document layout and exposed as a tagged text fragment, indicating the content is linked.

20 Claims, 11 Drawing Sheets

(56) References Cited

U.S. PATENT DOCUMENTS

| | | | | |
|---|---|---|---|---|
| 2012/0177536 A1* | 7/2012 | Sakai | ................ | G01N 27/4175 |
| | | | | 422/67 |
| 2012/0254724 A1* | 10/2012 | Doi | ................ | G06F 17/272 |
| | | | | 715/234 |
| 2012/0324350 A1* | 12/2012 | Rosenblum | ................ | G06F 17/21 |
| | | | | 715/256 |
| 2013/0179761 A1* | 7/2013 | Cho | ................ | G06F 17/2235 |
| | | | | 715/202 |
| 2014/0281918 A1* | 9/2014 | Wei | ................ | H04L 67/02 |
| | | | | 715/234 |
| 2016/0337426 A1* | 11/2016 | Shribman | ................ | H04L 65/4084 |
| 2017/0091173 A1* | 3/2017 | Yao | ................ | H04L 41/12 |
| 2017/0109785 A1* | 4/2017 | Vidra | ................ | G06Q 30/0256 |
| 2017/0316091 A1* | 11/2017 | Edge | ................ | G06F 17/21 |
| 2017/0344526 A1* | 11/2017 | Smith | ................ | G06F 17/211 |

\* cited by examiner

INSERTING LINKED TEXT FRAGMENTS IN A DOCUMENT

BACKGROUND

Document typography involves the arrangement and styling of material such as text, images, and the like in a document. Historically a manual process, typesetting today is usually done with a typography application executed on a computing device. One example of a typography application to electronically typeset documents is Adobe's InDesign® application.

When text is imported into the layout of a document in a typography application, significant effort can be spent to create and arrange text frames, which exacerbates the difficulties in editing the layout of the document when the text frames need to be updated. As an example, FIG. 1 illustrates an example environment 100 with example document layouts in accordance with one or more aspects of the disclosure. Example environment 100 includes an example computing device 102 configured to display document layout 104 and document layout 106. Document layout 104 and document layout 106 are example document layouts in which text has been imported into a text frame.

For instance, document layout 104 includes text frame 108. Text in text frame 108 can be constant content or variable content. Bold text in text frame 108 (e.g., "Name", "Description", and "Price($)" is constant content in that it is not intended to be updated when content outside of document layout 104 changes. However, the remaining text in text frame 108 (e.g., "Black Shirt", "From the latest collection for men. Finest quality.", and "500") is variable content and is intended to be updated when content outside of document layout 104 changes (e.g., content on a server changes). When the variable content becomes stale and needs to be updated (e.g., because the description of the black shirt has changed on a manufacturer's server), text frame 108 has no mechanism to update variable content separately from constant content. Consequently, when text frame 108 is updated as a whole, styling attributes (e.g., between constant content and variable content, between different paragraphs, and the like) are lost and must be re-applied manually.

To accommodate constant content and variable content in a document layout, users may create multiple text frames, as illustrated in document layout 106. Document layout 106 includes text frames 110, 112, and 114 for constant content "Name", "Description", and "Price($)", respectively, and text frames 116, 118, and 120 for variable content "Black Shirt", "From the latest collection for men. Finest quality.", and "500", respectively. In this example, variable content in text frames 116, 118, and 120 can be updated without affecting the styling of constant content of text frames 110, 112, and 114. However, the creation and arrangement of multiple text frames in a document layout is tedious. For instance, text in each text frame must be properly justified, and the text frames must be arranged with respect to each other, so the document layout is aesthetically appealing. Unfortunately, this tedious process results in a document layout that is overly sensitive to small changes in that a change to one text frame may cause significant changes to the document layout as a whole, and thus require significant manual effort to re-typeset the document. For instance, when variable content is updated in one of text frames 116, 118, and 120, document layout 106 may need to be re-typeset by rearranging all of text frames 110, 112, 114, 116, 118, and 120.

SUMMARY

Techniques and systems are described to create links to content for multiple text fragments within a text frame. Styling of content is preserved when content is updated by applying attributes of a location in a text frame (e.g., from a cursor indication at the start of a text fragment) to text inserted in the text fragment. Consequently, a text frame can include multiple text fragments with constant content (e.g., content not intended to be updated), and multiple text fragments with variable content (e.g., content intended to be updated when a content source is modified). Text fragments with variable content can be independently or jointly updated without requiring the text frame to be updated as a whole and re-styled. Accordingly, text from an asset (e.g., an image, video, document, file, and the like) on a server can be placed in one or more text fragments in a text frame of a document layout on a user computing device, and updated via a link when the text or asset on the server is modified. The link can bind a representation of text (e.g., a name of a metadata field containing the text of the asset) to a location (e.g., path) of the asset containing the text. Furthermore, a logical structure of the document is created that can be directly edited or indirectly generated based on editing in the layout of the document, and exported to another document to reproduce the document layout. Moreover, a user interface is generated that exposes text of assets and a document layout. Text exposed via the user interface, once selected, is inserted into the document layout and exposed as a tagged text fragment, indicating the text of the text fragment is linked.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
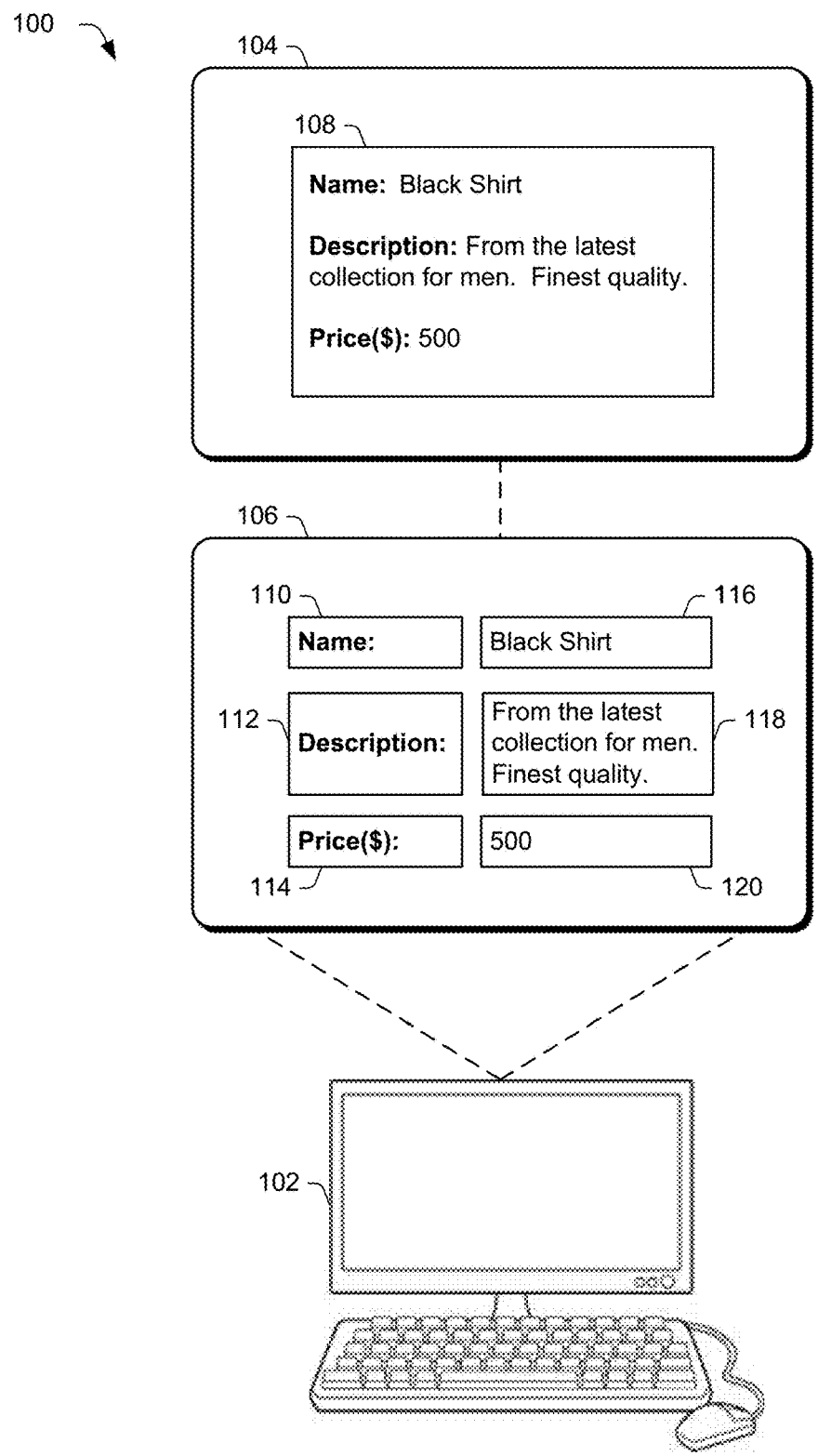
FIG. 1 illustrates an example environment with example document layouts in accordance with one or more aspects of the disclosure.

Traditional typography applications update a text frame as a whole, not distinguishing between constant content and variable content, and therefore do not preserve styling attributes of the text frame, such as different styles between constant content and variable content. Furthermore, the creation and layout of multiple text frames can require significant manual effort. As a result, when variable content is updated, the layout of multiple text frames can be significantly impacted by a small change of a single text frame among the multiple text frames, requiring significant manual effort to re-typeset and re-style the layout of the document.

Accordingly, this disclosure describes systems and techniques for creating links to content for multiple text fragments within a text frame and preserving style attributes when content is updated. A text frame can include multiple text fragments with constant content, and multiple text fragments with variable content. Text fragments with variable content can be independently or jointly updated, so that the text frame can be updated in part, rather than requiring the entire text frame to be updated. Style attributes are preserved when a text fragment is created or updated by applying attributes associated with a location in the text frame or document layout, such as indicated by a cursor click within an existing text frame or text fragment to insert text within the existing text frame, or a cursor click on the layout of the document to create a new text frame and insert text within a text fragment of the new text frame.

Text of an asset (e.g., an image, video, document, file, and the like) on a server can be placed in one or more text fragments in a text frame of a document on a user computing device. A link is generated that binds a representation of the text (e.g., information in a node for the text of a logical structure for the document, a name of a metadata field that includes the text, a location in an asset where the text is located, the text itself, and the like) to a location or path of the asset containing the text. When text of the asset is modified or moved on the server, a document typography system receives an indicator of the change via a respective link for the text (e.g., by periodically looking for updates, or being notified by the server when a change is made). Consequently, the document is updated by inserting text of the asset into a text fragment of a text frame in a document layout of the document, while preserving the style attributes of the text frame. Hence, the text frame and layout of the document do not need to be re-styled or re-typeset based on the updated text fragment.

Furthermore, a document typography application generates a logical structure of the document that can be exported to another document to reproduce the document. One example of a logical structure is an extensible markup language (XML) with nodes corresponding to assets and content of assets (e.g., text, images, fields, and the like) in a hierarchy. Nodes can be directly edited to affect a change in the document layout, such as by editing a representation of text, field name, link, or path and causing the document layout to be updated. Additionally or alternatively, nodes of the hierarchy can be generated and updated based on editing in the layout of the document. For instance, a user may insert new text from a new field of an asset in the layout of the document, causing a new node to be created in the hierarchy of the logical structure that corresponds to the newly inserted text, named according to the new field.

Moreover, a document typography application generates a user interface for inserting text of an asset as linked text fragments in a layout of a document. The user interface displays a layout of the document that can be edited by indicating a location on the layout and causing text from an asset (e.g., from a user-selected asset) to be inserted as a text fragment of a text frame at the location. A user interface can display links of text fragments with respective statuses, and details of a selected link, including warning messages with user-selectable options to repair a broken link. A user interface can also display assets (e.g., assets on a database of a server that can be selected by a user, assets of a user's personal asset collection, and the like), and any suitable text of assets, such as metadata, text in a metadata field of an asset, consumable text of an asset (e.g., a news story, book chapter, or magazine), text in an image, subtitles of a video, hardware configuration settings of a device, and the like. Furthermore, a user interface can display a logical structure of layout of a document that can be edited via the user interface.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
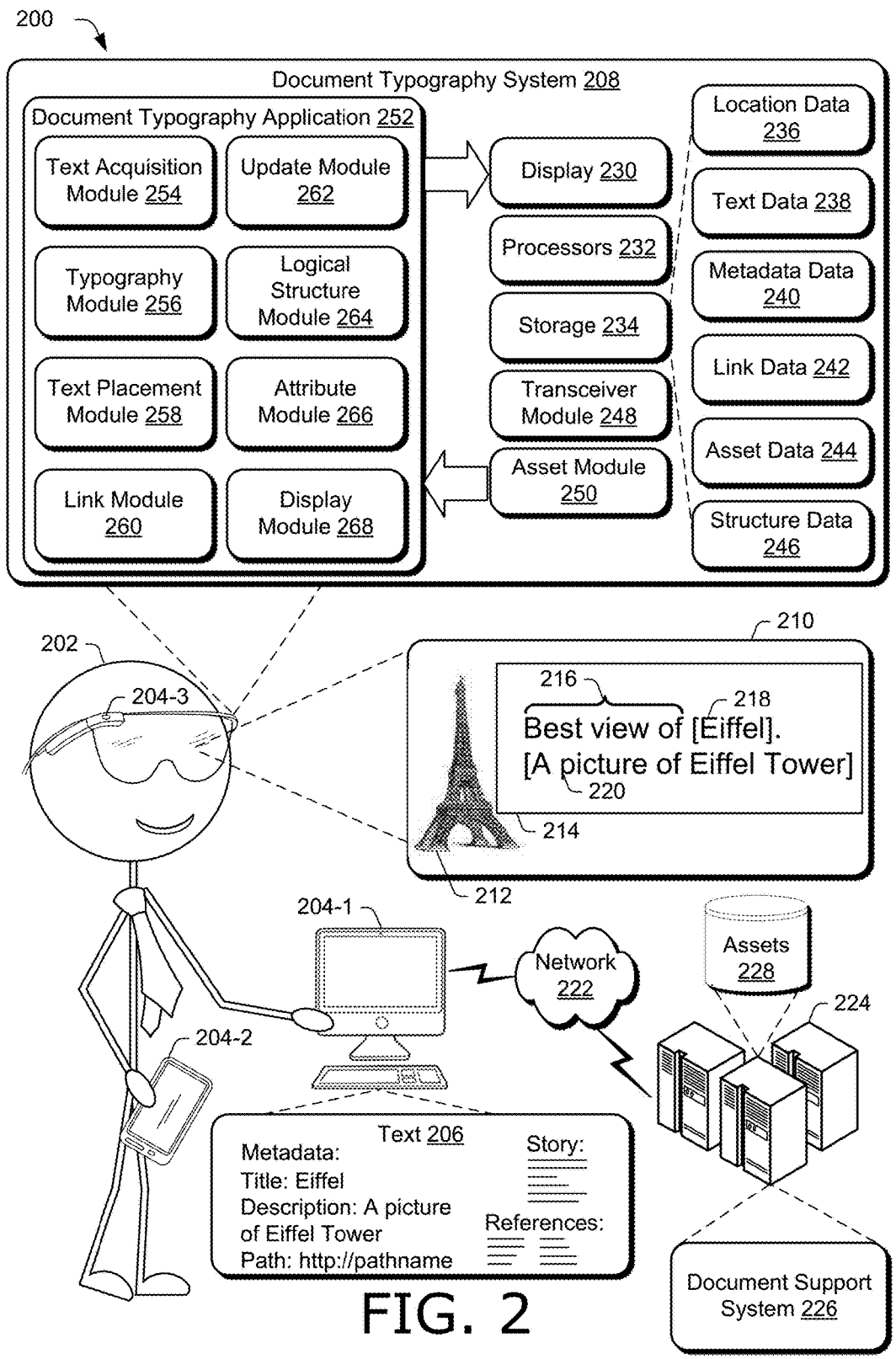
FIG. 2 illustrates a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes a user 202 having at least one computing device. In the example in FIG. 2, user 202 is illustrated as having three computing devices, computing devices 204-1, 204-2, and 204-3 (collectively 204). For instance, computing device 204-1 depicts a desktop computer, computing device 204-2 depicts a tablet or smart phone, and computing device 204-3 depicts a pair of eye glasses (e.g., smart goggles). Computing devices 204 are example computing devices, and any suitable computing device is contemplated, such as a mobile phone, tablet, laptop computer, desktop computer, gaming device, goggles, glasses, camera, digital assistant, echo device, image editor, non-linear editor, digital audio workstation, copier, scanner, and the like. Furthermore, discussion of one of computing devices 204 is not limited to that computing device, but generally applies to each of the computing devices 204. Moreover, computing devices 204 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 204. For example, computing devices 204 can recognize input as being a mouse input, stylus input, touch input, input provided through a natural user interface, and the like. Thus, computing devices 204 can recognize multiple types of gestures including touch gestures and gestures provided through a natural user interface. In one example, computing devices 204 include speech recognition, identification, and synthesis functionalities, microphones, and speakers that allow computing devices 204 to communicate with user 202 in a conversation, e.g., a user conversation.

Figure 11:
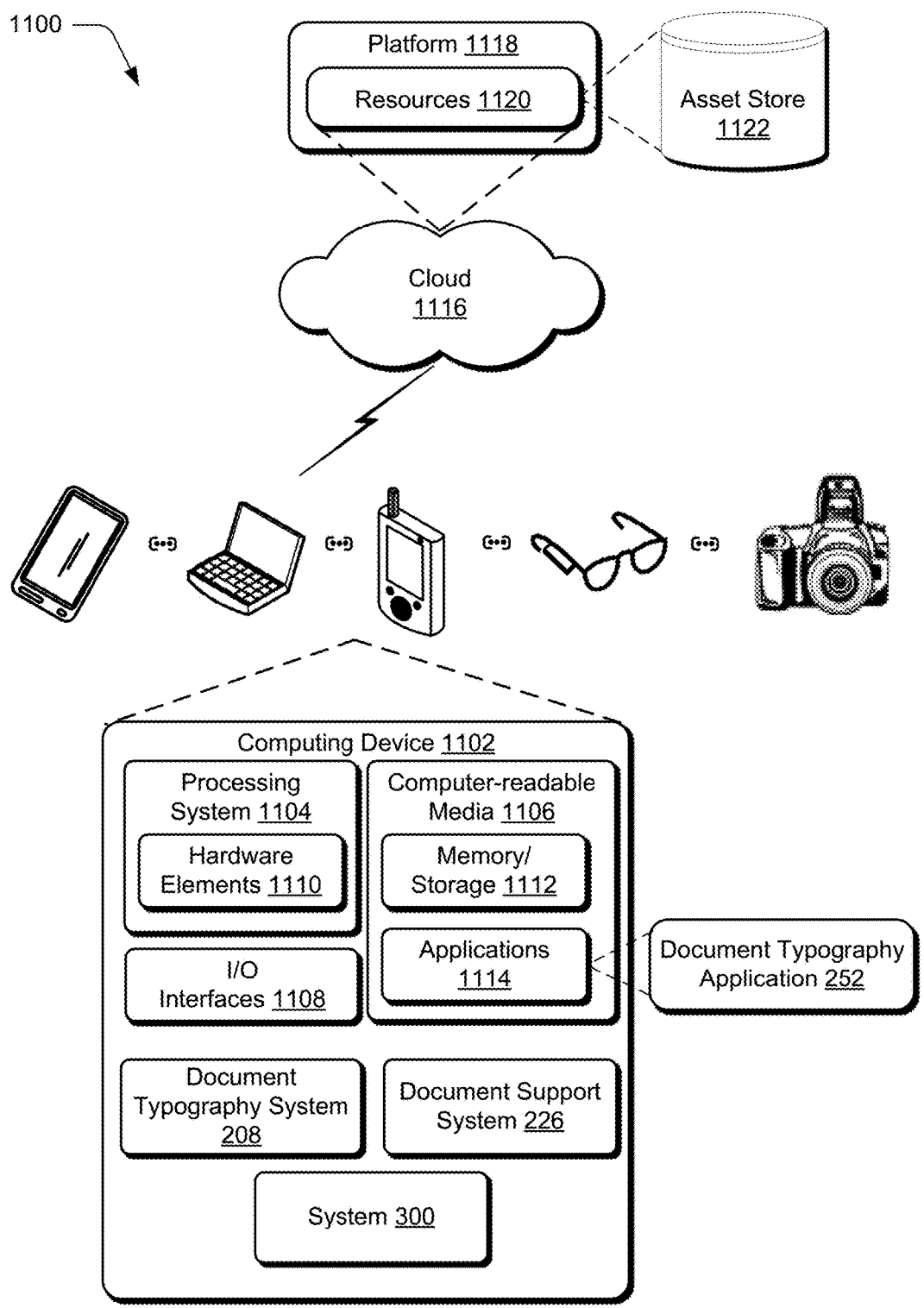
FIG. 11 illustrates an example system including various components of an example device that can be implemented as any type of computing device as described and/or utilized with reference to FIGS. 1-10 to implement aspects of the techniques described herein.

Furthermore, computing devices 204 may be representative of one or a plurality of different devices, such as one or more devices connected to a network that perform operations "over the cloud" as further described in relation to FIG. 11. In one example, computing devices 204 are communicatively coupled to each other, such as with a low power wireless communication standard (e.g., a Bluetooth® protocol). For instance, computing device 204-1 can communicate wirelessly with computing device 204-2 and computing device 204-3. Hence, a document generated or stored on one device (e.g., computing device 204-1) can be communicated to, and displayed on another device (e.g., computing device 204-3).

In the example illustrated in FIG. 2, computing device 204-1 obtains text 206. Text 206 is text of an asset (e.g., text 206 can be included in a metadata field of an asset, in a consumable portion of an asset, such as a news story, book chapter, or magazine), text in an image, text in a document, table spreadsheet, or list, subtitles of a video, hardware configuration settings of a device, text in a database of assets, and the like). Text 206 can be obtained in any suitable way, such as from another computing device, from file storage on computing device 204-1, and the like. Based on text 206 obtained by computing device 204-1, computing device 204-3 uses document typography system 208 (discussed in more detail below) to generate document layout 210 in a user interface on computing device 204-3 (e.g., a head mounted display). Additionally or alternatively, document layout 210 can be displayed on a display screen of computing device 204-1 or computing device 204-2. Continuing the example in FIG. 2, document layout 210 includes image 212 and text frame 214 that correspond to text 206. For instance, image 212 represents an asset including text 206 and has been inserted into document layout 210 by user 202. In one example, text 206 is obtained and displayed on computing device 204-1 in response to user 202 selecting an asset including image 212, inserting image 212 into document layout 210, or a combination thereof.

Text 206 can include any suitable text of an asset, such as text in metadata, a story, a bibliography, a table of contents, subtitles, and the like. In the example in FIG. 2, text 206 includes metadata, a story, and references. For instance, metadata of text 206 may describe information about image 212, a story of text 206 may include an editorial of image 212, e.g., describing a history of the Eiffel Tower, it's construction, funding, etc., and references of text 206 may include references to other assets related to the subject matter of image 212 (e.g., the Eiffel Tower, towers, or public monuments), citations in a story of text 206, or combinations thereof. In the example in FIG. 2, metadata of text 206 includes a title field with the text "Eiffel", a description field with the text "A picture of Eiffel Tower", and a path field with a pathname (e.g., a location of image 212). A story of text 206 and references of text 206 are illustrated with horizontal lines (e.g., denoting paragraphs or lines of text).

Text frame 214 of document layout 210 includes three text fragments. Text fragment 216 includes constant content "Best view of". The content of text fragment 216 is constant because it is not intended to change when text 206 changes. Text frame 214 also includes text fragment 218 and text fragment 220, which both contain variable content. For instance, text fragment 218 is linked to metadata field "Title" of text 206, and thus contains the text "Eiffel" that is also contained in the metadata field "Title" of text 206. Moreover, text fragment 220 is linked to metadata field "Description" of text 206, and thus contains the text "A picture of Eiffel Tower" that is also contained in the metadata field "Description" of text 206. Because text fragment 218 and text fragment 220 are linked to metadata fields of text 206, text fragment 218 and text fragment 220 are tagged and denoted as tagged (e.g., having respective links) in document layout 210 in any suitable way, such as with brackets, highlights, color, italics, font, bold, and the like. For instance, in the example in FIG. 2, text fragment 218 and text fragment 220 are each denoted between hard brackets, "[" and "]". Furthermore, the text of text fragment 218 and text fragment 220 has been inserted into text frame 214 with the same style attributes as the text of text fragment 216.

Though FIG. 2 illustrates how metadata of text 206 is inserted as linked text fragments in document layout 210, any suitable text of text 206 can be inserted as linked text fragments in document layout 201, such as text of a story of text 206, text of references of text 206, and the like.

Text frame 214 can be updated without updating the entire contents of text frame 214, such as by updating the text of text fragment 218, text fragment 220, or text fragment 218 and text fragment 220 (e.g., text frame 214 can be updated responsive to receiving an indication that content of a metadata field of text 206 has been modified or moved). Hence, text frame 214 can be updated while preserving style attributes of text frame 214 (e.g., differences in font between text fragment 216 and text fragments 218 and 220), and without requiring text frame 214 to be rearranged in document layout 210 (e.g., repositioning text fragments 216, 218, and 220 relative to one another), or re-styled.

Computing devices 204 are also coupled to network 222. Network 222 communicatively couples computing devices 204 with server 224 (for clarity, only computing device 204-1 is illustrated in FIG. 2 as coupled to network 222, though computing devices 204-2 and 204-3 can also be coupled to server 224 via network 222). Network 222 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 224 may include one or more servers or service providers that provide services and/or resources to computing devices 204. Generally, resources provided by server 224 may be licensed, purchased, or may be made freely available, (e.g., without authentication, license, or account-based access). The resources can include any suitable combination of services and content, such as made available over network 222 by one or more providers. Some examples of services include, but are not limited to, an on-line shopping service, a photo editing service, a web development and management service, a collaboration service, a social networking service, a messaging service, an advertisement service, a graphics design service, an image storage service (including storage of photos, documents, records, files, and the like), a document typography service, an asset distribution service, and so forth. Content may include various combinations of assets, including videos, ads, audio, multimedia streams, animations, images, web documents, web pages, applications, device applications, text documents, drawings, presentations, stock photographs, user profiles, user preferences, user data (e.g., images stored in an image gallery), maps, computer code, and the like. Assets may be made available to document typography system 208, document support system 226, or combinations thereof, and stored at assets 228 of server 224. Hence, text 206 can include any suitable text of an asset stored at assets 228 of server 224.

Furthermore, server 224 includes document support system 226 configurable to receive signals from computing devices 204, process the received signals, and send the processed signals to computing devices 204 to support inserting linked text fragments in a document, such as a document having document layout 210. For instance, computing device 204-1 may obtain a document layout representing a document to typeset, and communicate a logical structure including links of text fragments to server 224. In one example, communication of a logical structure including links of text fragments to server 224 is part of a status inquiry performed on a regular basis, such as periodically, or upon execution or start-up of document typography system 208 (or any suitable module or application of document typography system 208) to determine the status of linked text fragments. Server 224 may identify what links are broken, out of date, reference missing or moved content, and the like, (if any) and report affected links and respective content to one of computing devices 204, which updates the linked text fragments.

Additionally or alternatively, server 224 may update a logical structure of a document received from one of computing devices 204 according to text affected by broken, out of date, or stale links (e.g., links referencing missing or moved content), and communicate an updated logical structure back to one of computing devices 204. One of computing devices 204 can generate an updated document layout from the updated logical structure received from server 224. Accordingly, document support system 226 of server 224 can include a copy of document typography system 208, including document typography application 252 (discussed below in more detail).

Computing devices 204 include document typography system 208 to insert text as linked text fragments of a text frame in a layout of a document, such as document layout 210. For clarity, computing device 204-3 is illustrated in FIG. 2 as including document typography system 208, though computing device 204-1 and computing device 204-2 also include copies of document typography system 208 (not shown).

Document typography system 208 includes a display 230 for displaying documents, assets, document layouts, such as document layout 210, text, metadata, links, user interfaces, and the like. Display 230 can be any suitable type of display, such as a touchscreen, liquid crystal display, plasma display, head-mounted display, projector and screen, and the like. Document typography system 208 also includes processors 232. Hence, document typography system 208 may be implemented at least partially by executing instructions stored on storage 234 on processors 232. For instance, processors 232 may execute portions of document typography application 252.

Storage 234 can be any suitable type of storage accessible by or contained in document typography system 208. Storage 234 stores and provides access to and from memory included in storage 234 for any suitable type of data. For instance, storage 234 includes location data 236 (e.g., positions of elements (e.g., text frames, images, and the like) in a document layout, positions of text fragments within a text frame, attributes of locations, such as font type, size, color, bold, italics, and the like, histories of positions selected by users, etc.), text data 238 (e.g., data representing text of text fragments, text of an asset (e.g., text of a metadata field, story, references, bibliography, subtitles, footnotes, etc.), text received in a user input, text included in a document layout, and the like), metadata data 240 (e.g., data related to metadata of an asset, such as content of metadata fields, numbers of metadata fields, types of metadata fields, sizes of metadata fields, permissions associated with metadata (e.g., access levels of users), locations of metadata (e.g., paths, universal resource locators (URL's), directory names), statuses of metadata (e.g., up-to-date, missing, or moved), and the like), link data 242 (e.g., data regarding links for text fragments in a document layout, such as numbers of links, names of links, numbers of text fragments in a document layout associated with a particular link, page numbers of a document that a linked text fragment occurs, paths of assets or sources referenced in a link, and the like), asset data 244 (e.g., data regarding assets that can be used to obtain text to insert as text fragments into a document layout, such as copies of assets obtained from a database search of assets, locations and names of servers hosting databases of assets, histories of user-selected assets, asset taxonomies, including categories and hierarchies of assets arranged according to any suitable indicator (e.g., asset content, filename, asset format (e.g., color versus black and white), combinations thereof, and the like), and structure data 246 (e.g., data representing a logical structure of a document layout (e.g., an XML structure), data included in nodes of a logical structure, histories of logical structures, including revision histories of logical structures that can be used to revert a document to a previous version (e.g., with a previous document layout, content, or both), and the like).

Furthermore, document typography system 208 includes transceiver module 248. Transceiver module 248 is representative of functionality configured to transmit and receive data using any suitable type and number of communication protocols. For instance, data within document typography system 208 may be transmitted to server 224 with transceiver module 248. Furthermore, data can be received from server 224 with transceiver module 248. Transceiver module 248 can also transmit and receive data between computing devices 204.

Document typography system 208 also includes asset module 250. Asset module 250 is representative of functionality configured to maintain assets associated with a document, such as a document represented by document layout 210. For instance, asset module 250 can manage image libraries of a user, including images stored in a user's image editing application, such as Photoshop®. Furthermore, asset module 250 integrates assets and text a user manipulates on or from one of computing devices 204 into a gallery of assets stored on storage 234, such as images a user posts in a social media post or blog from one of computing devices 204, images a user has attached to an email, text, or other communication sent from or received by computing devices 204, and the like. Asset module 250 also manages and stores assets selected by a user for inclusion into a document, such as assets from assets 228 used to form document layout 210. Asset module 250 makes assets from galleries maintained by asset module 250 available to document typography application 252. By maintaining and managing suitable assets (e.g., assets preferred by a user), asset module 250 can quickly and efficiently provide assets to document typography application 252. In one example, assets maintained by asset module 250 are preemptively displayed in a user interface generated by document typography application 252 as suggestions having content (e.g., text) that can be selected by a user and inserted as text fragments of a text frame. Assets maintained by asset module 250 can be stored in asset data 244.

Document typography system 208 also includes document typography application 252. Document typography application 252 includes text acquisition module 254, typography module 256, text placement module 258, link module 260, update module 262, logical structure module 264, attribute module 266, and display module 268. These modules work in conjunction with each other to insert text of an asset as linked text fragments in a document layout of a document.

Furthermore, though the description of document typography system 208 and document typography application 252 describes inserting text of an asset, the systems, procedures, and devices described herein are not limited to inserting linked text. Text is described as an example of a content element that can be inserted into a text frame as a text fragment and linked to an asset. However, the systems, procedures, and devices described herein, including document typography system 208 and document typography application 252, are also operable to insert other types of content elements into a document layout than text, such as images, animations, illustrations, multi-media, symbols, emoticons, URL's, drawings, emblems, maps, binary data, tables, graphs, charts, spreadsheets, slides, and the like.

Text acquisition module 254 is representative of functionality configured to obtain content (e.g., text) of an asset. Text acquisition module 254 can obtain any suitable text and data regarding text of an asset, in any suitable way. In one example, text acquisition module 254 obtains a selection of a metadata field of an asset, such as a user selection in a user interface of a displayed metadata field, and obtains text of the selected metadata field. Additionally or alternatively, text acquisition module 254 can obtain text of an asset from a selection of text displayed for an asset. For instance, a user may select (e.g., highlight or select with a keyboard) text in a story displayed in a user interface describing an image (e.g., an asset) also displayed in the user interface.

Text acquisition module 254 may obtain a location in an asset, such as a field, page and line number, coordinate, character numbers, and the like, and provide content of the asset, such as text, for insertion into a text fragment of a text frame in a document layout. For instance, text acquisition module 254 may obtain a link or status of a link from update module 262 and search assets 228 of server 224 for updated content of an asset, and provide the updated content (e.g., text) to modules of document typography system 208.

Content of an asset, such as text, obtained by text acquisition module 254, along with any suitable information about the content, are stored in text data 238 of storage 234 and made available to modules of document typography application 252. Furthermore, any suitable information about assets and locations of text in assets, such as a number of metadata fields, types of metadata fields, sizes of metadata fields, permissions associated with metadata (e.g., access levels of users), locations of metadata (e.g., paths, URL's, and directory names), statuses of metadata (e.g., up-to-date, missing, or moved), and the like, used by or calculated by text acquisition module 254 are stored in metadata data 240 of storage 234 and made available to modules of document typography application 252.

Typography module 256 is representative of functionality configured to receive an indicator of a location in a document. In one example, typography module 256 receives an indication of a position in a text frame in a layout of a document. For instance, an indication of position can include receiving a range of selected text, such as highlighted text, or user-selected text (e.g., with a mouse, keyboard, speech, or combinations thereof).

An indication of position can denote where to create a new text frame in a document layout. In one example, a user indication of position is received in a document layout outside an existing text frame (e.g., in the document layout where there are no text frames). In this case, a new text frame is created at the position. In another example, a user indication of position is received in a document layout inside an existing text frame. In this case, the position is used to create a new text fragment within the text frame, in which linked text from an asset can be inserted. An indication of position can be any suitable indication, such as a mouse click, touch on a touchscreen, coordinate location (e.g., coordinates in a spatial system, such as Cartesian coordinates) including absolute and relative coordinates (e.g., relative to an origin of the coordinate system or another point or object in the document layout, respectively), and the like.

Furthermore, typography module 256 obtains attributes of a location obtained by typography module 256. For instance, when a position is indicated within a text frame, style attributes of the indicated position within the text frame are obtained by typography module 256. Any suitable style attributes of a location can be obtained, such as font size, style (e.g., courier versus times new roman), color, bold, italics, emphasis, footnote, superscript, subscript, and the like. Location attributes, including style attributes of a location obtained by typography module 256, are provided by typography module 256 to attribute module 266.

Typography module 256 also provides a location in a document layout obtained from an indicator of position to text placement module 258. Moreover, a location in a document layout obtained by typography module 256, along with any suitable information, such as location attributes, positions of elements (e.g., text frames, images, and the like) on a document layout, positions of text fragments within a text frame, attributes of locations, such as font type, size, color, bold, italics, and the like, histories of positions selected by users, and the like, used by or calculated by typography module 256 are stored in location data 236 of storage 234 and made available to modules of document typography application 252.

Text placement module 258 is representative of functionality configured to insert content of an asset (e.g., text) as a text fragment into a text frame at a position or location in a document layout received by typography module 256. Inserting text as a text fragment can include any suitable way of insertion, such as removing old text and then replacing it with text from an asset, overwriting text of a text fragment with text from an asset, deleting the text fragment and creating a new text fragment by inserting text of an asset into the new text fragment, and the like.

In one example, text placement module 258 receives a location from typography module 256 and places text of an asset in a text fragment of a text frame of a document by (i) when the location is indicated inside the text frame, placing the text at the location, and (ii) when the location is indicated outside all text frames of the document, generating the text frame at the location as a new text frame and placing the text at the location in a newly generated text fragment of the text frame.

Furthermore, text placement module 258 can tag text fragments of a text frame. For instance, text fragments with variable content that is linked to an asset may be indicated in a document layout by tagging the text fragments with any suitable designator, such as brackets (e.g., hard, curly, or soft brackets), highlights, color, italics, font size, font type, bold, background, and the like. In the example in FIG. 2, text placement module 258 denotes text fragment 218 and text fragment 220 between hard brackets, "[" and "]", to indicate the text fragments contain linked, variable content. Accordingly, tagging a text fragment can include indicating metadata text with a representation indicating boundaries of the text fragment.

A tagged text frame generated by text placement module 258, along with any suitable information, such as, tags, data removed from or replaced in a text fragment when new text is inserted, data representing text of text fragments, text of an asset (e.g., in a metadata field of the asset), text received in a user input, text included in a document layout, and the layout, and the like, used by or calculated by text placement module 258 are stored in text data 238 of storage 234 and made available to modules of document typography application 252. In one example, text placement module 258 provides a tagged text frame (e.g., a text frame having one or more text fragments tagged as including linked content) to attribute module 266.

Attribute module 266 is representative of functionality configured to apply style attributes associated with a location to text in a text fragment. For instance, attribute module 266 applies style attributes of a location indicated by a user selection to text inserted into a text fragment from an asset at the location. Accordingly, attribute module 266 preserves styling attributes of a text frame when a new text fragment is created or an existing text fragment is updated.

A location can be any suitable location, such as a cursor position or range of text. Furthermore, attributes can include any suitable styling attributes associated with a location, such as font type, size, color, bold, italics, background, shading, fill material or pattern, outline, line width, filter, footnote, subscript, superscript, and the like.

Attribute module 266 applies attributes to a tagged text frame and generates a styled text frame. A styled text frame is provided by attribute module 266 to display module 268, for display in a document layout of a user interface. Furthermore, a styled text frame generated by attribute module 266, along with any suitable information, such as attributes applied by attribute module 266, attributes of text inserted by text placement module 258 prior to applying attributes by attribute module 266, attributes of content of an asset, and the like, used by or calculated by attribute module 266 are stored in text data 238 of storage 234 and made available to modules of document typography application 252. In one example, a styled text frame generated by attribute module 266 is exposed in document layout in a user interface.

Link module 260 is representative of functionality configured to create a link for a text fragment containing content (e.g., text) of an asset by binding a representation of the text and a location of an asset. A representation of the text can be any suitable representation, such as the text itself, in part or in while, a name of a field or locator of the text in an asset (e.g., a name of a metadata field containing the text, a citation number in a bibliography of a citation containing the text, etc.), a name of a node for the text in a logical structure of a document layout, combinations thereof, and the like.

Binding can be done in any suitable way. In one example, a name of the link includes a name of the asset (e.g., the filename), a locator of the text in the asset (e.g., a name of a metadata field containing the text in the asset), or combinations thereof. Additionally or alternatively, binding a representation of text and a location of an asset containing the text can include populating a first field of a data structure with a representation of the text, such as a name of a field (e.g., metadata field, field in a table of a document, data entry field, cell in a spreadsheet, and the like), and a second field of the data structure with a location of the asset, e.g., a pathname. The data structure can be included in the link generated by link module 260.

Moreover, link module 260 can generate a link for a text fragment by binding information of a node in a logical structure for a document to a location of an asset containing the text. For instance, a node may include a name of a metadata field that is bound to an asset location (e.g., a pathname) to create a link. Hence, a link generated by link module 260 can be used to locate an asset and determine if content of the asset has been modified or moved. Additionally or alternatively, a link generated by link module 260 can be used to generate or update a node of a logical structure, such as by including a link generated by link module 260 as content of a node or part of a name of a node.

Links generated by link module 260, along with any suitable information, such as data regarding links for text fragments in a document layout, such as numbers of links, names of links, numbers of text fragments in a document layout associated with a particular link, page numbers of a document that a linked text fragment occurs, paths of assets or sources referenced in a link, and the like, used by or calculated by link module 260 are stored in link data 242 of storage 234 and made available to modules of document typography application 252. In one example, link module 260 provides a link for a text fragment to update module 262, display module 268, and logical structure module 264.

Logical structure module 264 is representative of functionality configured to create and manage a logical structure for a document, including a hierarchy of nodes. A logical structure can have a plurality of nodes, each node corresponding to a respective text fragment of a text frame of the document. An example of a logical structure is XML code. In one example, a logical structure includes a node for each text fragment of one or more assets that is linked to one or more text fragments in a document. Additionally or alternatively, a logical structure includes a node for each field (e.g., a metadata field) of one or more assets that is linked to one or more text fragments in a document.

A logical structure generated and managed by logical structure module 264 can be used to reproduce a document represented by the logical structure. Hence, a logical structure of a document created on a first computing device can be exported from the first computing device and imported to a second computing device, and used to reproduce on the second computing device the document created on the first computing device.

Furthermore, a logical structure generated and managed by logical structure module 264 can be displayed on and edited via a user interface generated and exposed by display module 268. In one example, a modification to information in one of the nodes of a logical structure is received by logical structure module 264 by receiving the modification as a user edit to the logical structure exposed in the user interface. Additionally or alternatively, a logical structure generated and managed by logical structure module 264 can be indirectly edited. For instance, logical structure module 264 can receive instructions to edit a logical structure from text placement module 258, attribute module 266, update module 262, or combinations thereof, responsive to edits applied to a document layout exposed in a user interface by display module 268.

Moreover, a logical structure generated and managed by logical structure module 264 can include any suitable information, such as links provided by link module 260, designators for content type (e.g., types of content of assets), locations of assets (e.g., pathnames of assets located on a server database), positions of content elements within a document layout, designators of style attributes, and the like. In one example, a node includes a pathname that appends a URL with a name of a field, such as a metadata field, data entry field, cell in a spreadsheet, and the like.

A logical structure generated and managed by logical structure module 264, along with any suitable information, such as data regarding links for text fragments in a document layout, data included in nodes of a logical structure, histories of logical structures, including revision histories of logical structures that can be used to revert a document to a previous version, and the like, used by or calculated by logical structure module 264 are stored in structure data 246 of storage 234 and made available to modules of document typography application 252.

Display module 268 is representative of functionality configured to manage and expose a user interface on a display, such as display 230, for inserting linked text fragments in a document. Display module 268 can expose any suitable data of document typography system 208 in any suitable user interface (example user interfaces exposed by display module 268 are discussed below in more detail). In one example, display module 268 exposes a user interface that displays a plurality of links representing respective text fragments, such as in a links panel. Responsive to a user selection of one of the plurality of links, the user interface displays text corresponding to the respective text fragment, such as text of a metadata field.

Additionally or alternatively, display module 268 can expose location data 236, text data 238, metadata data 240, link data 242, asset data 244, and structure data 246. For instance, display module 268 can generate a user interface to display assets from a server (e.g., thumbnails or full resolution images), and upon selection of text of an asset, display links associated with the text and a logical structure of a document with highlighted sections corresponding to the selected text.

A user interface generated and exposed by display module 268, along with any suitable information, such as data used by or calculated by display module 268, e.g., user selections, are stored in storage 234 and made available to modules of document typography application 252.

Update module 262 is representative of functionality configured to obtain statuses of links. Update module 262 can determine that an update to a document layout is required, provide indications of such a determination (e.g., warning messages), and configure document typography application 252 to update the document layout. In one example, update module 262 configures modules of document typography application 252 to update a text fragment with different text than text in the text fragment, the different text obtained from an asset based on a link corresponding to the text fragment, and generated by link module 260.

Accordingly, update module 262 can include a scheduler that determines a status of links generated by link module 260 by checking for updates of links, such as by comparing content or a revision number of content in a document layout with content or a revision number of content, respectively, in an asset at a source location. For instance, update module 262 may compare content of document layout 210 with content of an asset in assets 228 to determine a status of the content in document layout 210, such as up-to-date, missing, modified, and the like.

A scheduler in update module 262 can instruct update module 262 to check for updates to links in any suitable way and at any suitable time. In one example, update module 262 checks for updates to links periodically, at a predetermined rate, such as once a day, once a week, etc. Additionally or alternatively, update module 262 can check for updates to links responsive to an event, such as a user login (e.g., user verification on one of computing devices 204, server 224, or combinations thereof), a document layout (e.g., document layout 210) being opened in document typography system 208, document typography application 252 being launched or otherwise started on one of computing devices 204, a document being loaded into document typography system 208, and the like.

In one example, update module 262 checks for updates of links and determines a status of each link. Based on the statuses (e.g., if a status indicates a link is broken, content is missing or moved, and the like), update module 262 instructs document typography application 252 to perform an event, including expose a warning message in a user interface, direct a user to recommended actions to repair a link, automatically and without user intervention obtain updated content from an asset based on the link and update a document layout with the updated content (e.g., by inserting text from an asset into a text fragment), and the like. Hence, update module 262 can be configured to access storage 234 and provide any suitable data to any suitable module of document typography system 208, which operate as described above to insert text of an asset as linked text fragments in a document layout of a document. Furthermore, any suitable information, such as data used by or calculated by update module 262, such as statuses, scheduler parameters (e.g., time since last update check, time to next update check, results of update checks, and the like), are stored in storage 234 and made available to modules of document typography application 252 and document typography system 208.

Having considered an example digital medium environment, consider now a discussion of an example system usable to insert text of an asset as a linked text fragment in a document layout of a document in accordance with one or more aspects of the disclosure.

Example Document Typography System

Figure 3:
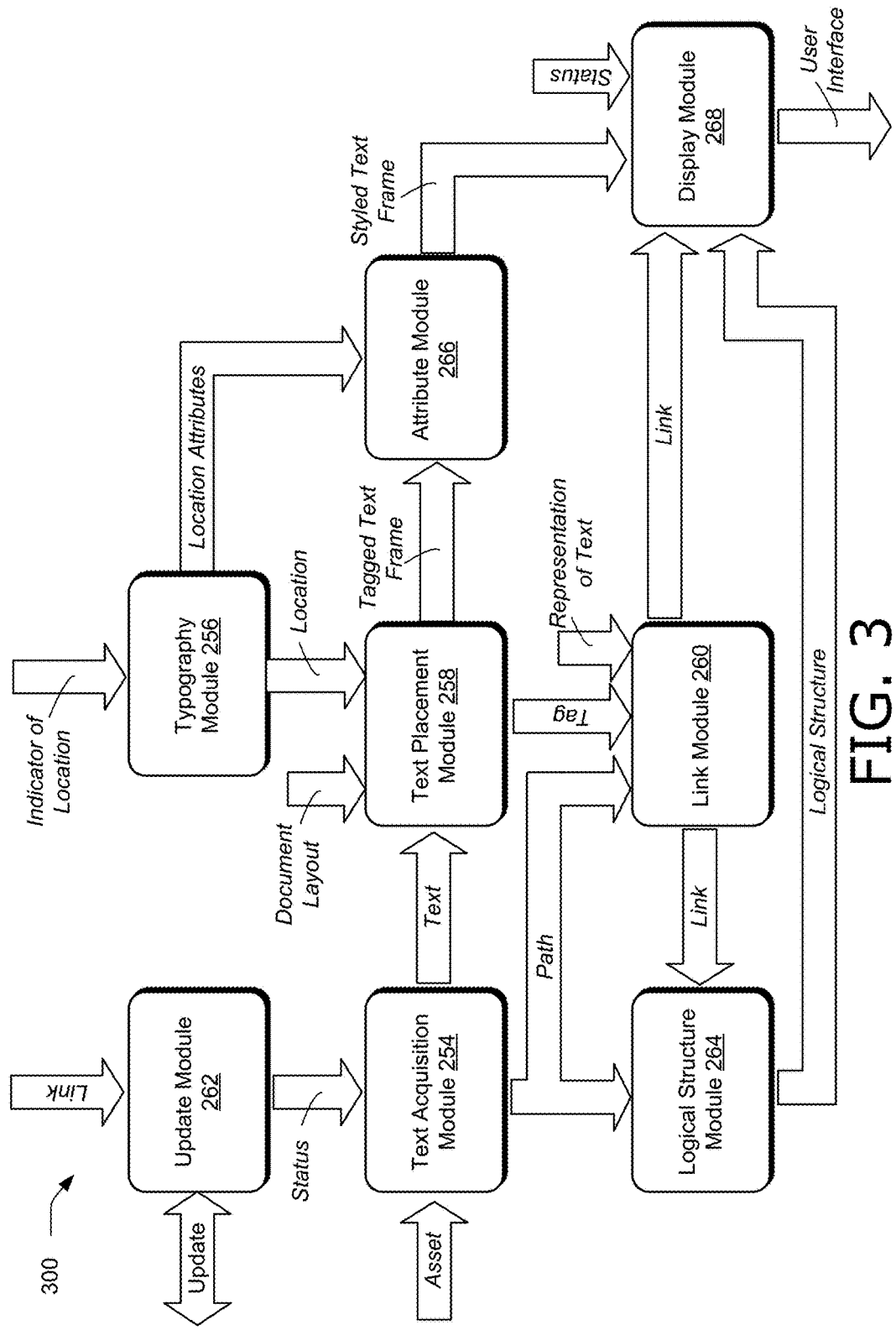
FIG. 3 illustrates an example system usable to insert text of an asset as a linked text fragment in a document layout of a document in accordance with one or more aspects of the disclosure.

FIG. 3 illustrates an example system 300 usable to insert text of an asset as a linked text fragment in a document layout of a document in accordance with one or more aspects of the disclosure. In this implementation, system 300 includes the modules of document typography application 252 as described in FIG. 2, e.g., text acquisition module 254, typography module 256, text placement module 258, link module 260, update module 262, logical structure module 264, attribute module 266, and display module 268. System 300 is one example of document typography system 208 that can be constructed using the modules of document typography application 252. For instance, signals can be redefined, and modules can be modified, combined, divided, added, or removed to form a modified system, without altering the functionality of system 300. Accordingly, such modified systems are considered to be within the scope of the disclosure.

Furthermore, for simplicity system 300 is limited to the modules of document typography application 252 and a description of some of their interconnects. System 300 can, however, include any suitable signals and communications between modules omitted for simplicity. Such signals may include system clocks, counters, page indicators, text frame indicators, text fragment indicators, reset signals, and the like. In one example, system 300 can operate in real time (e.g., with no perceptible delay to a user once a user selection is completed). Accordingly, signals can be calculated by the modules of system 300 and communicated between the modules of system 300 without significant delay, so that text of an asset is inserted as linked text fragments in a document layout without perceptible delay to a user.

Moreover, system 300 can be implemented on any suitable device or devices. In one example, system 300 is implemented on one computing device (e.g., one of computing devices 204 in FIG. 2). In another example, system 300 is implemented on more than one computing device. For instance, parts of system 300 can be implemented by a first computing device, such as computing device 204-1 in FIG. 2, and other parts of system 300 can be implemented by an additional computing device or devices, such as computing device 204-2. In one example, a server implements parts of system 300, such as server 224 in FIG. 2. A server can be remote, e.g., because it is not collocated with the first computing device. A server may be configured to receive signals of system 300 from a computing device (e.g., one or more of computing devices 204), process the received signals, such as with document support system 226, and transmit results of the processing back to the computing device. Hence, document support system 226 of server 224 in FIG. 2 may include system 300.

Additionally or alternatively, parts of system 300 can be implemented by an additional computing device that is collocated with a first computing device. For instance, one of computing devices 204 may be a first computing device, and another of computing devices 204 may be an additional, collocated computing device. The first computing device and the additional computing device may be operated by one or more users. Hence, system 300 provides for multiple users within an environment to share data included in system 300. For instance, a document layout can be obtained by a first computing device operated by a first user, and sent to another computing device operated by a second user. The second user can then insert text of an asset as a linked text fragment within a text frame of the document layout, and send a modified document layout (e.g., a logical structure of the document) back to the first user and the first computing device. The first user on the first computing device can then further modify the document layout by changing style attributes of the text fragment inserted by the second user, and share this modified document layout with the second user on the second computing device. A document layout can be displayed on the first computing device and the second computing device based on logical structures of a document shared between the first computing device and the second computing device.

Text acquisition module 254 obtains an asset, including a selection of text of the asset. For instance, a user may click on a representation of an asset (e.g., a thumbnail image) to expose metadata fields of the asset, and the user may then select one of the metadata fields to select text of the metadata field. Additionally or alternatively, a user may click on a representation of a document to expose a consumable portion of the document (e.g., a page of a book), and the user may then select text in the exposed portion of the document, such as by highlighting text, circling text with a stylus on a touchscreen, changing a style of text (e.g., bold, color, font, etc.), and the like. Text acquisition module 254 obtains an asset and text of the asset (e.g., user-selected text), and provides text to text placement module 258. Text acquisition module 254 also provides a path for an asset (e.g., a location of an asset including a location of the text within the asset, such as a page number, line number, field name containing the text, combinations thereof, and the like) to logical structure module 264 and link module 260.

Typography module 256 receives an indicator of a location in a document. In one example, a user selects a position in a document layout exposed in a user interface by display module 268, such as by highlighting a range of text, clicking on a cursor position (e.g., a start of a text fragment), tapping a touchscreen with a stylus, and the like. Typography module 256 also determines style attributes associated with a location in a document. For instance, when a user indicates a position in a document layout, typography module 256 determines the style attributes of that position in the document layout, such as font style and size, color, background, bold, italics, superscript, subscript, and the like.

Typography module 256 provides a location of a received indicator to text placement module 258. Typography module 256 also provides location attributes (e.g., style attributes of the location of the received indicator) to attribute module 266.

Text placement module 258 receives a location from typography module 256 and content of an asset (e.g., text) from text acquisition module 254, and inserts the content into a text fragment at the location in the document layout. For instance, when the location is indicated inside a text frame, text placement module 258 places the text at the location in the text frame. When the location is indicated outside all text frames of the document (e.g., the location is not inside an existing text frame in the document layout), text placement module 258 generates a text frame and text fragment at the location and places the text at the location.

Text placement module 258 also tags the inserted text as a linked text fragment, and provides an indication of a tag to link module 260. A tag can be denoted in a user interface exposed by display module 268 in any suitable way. In one example, text inserted into a text fragment is tagged with a representation indicating boundaries of the text fragment, such as braces encapsulating the range of text of the text fragment. Text placement module 258 provides a tagged text frame to attribute module 266. A tagged text frame can be provided in any suitable way, such as by providing a document layout including the tagged text frame at the location provided by typography module 256.

Attribute module 266 receives location attributes from typography module 256 and a tagged text frame from text placement module 258, and applies location attributes (e.g., attributes associated with an indicator of a location) to a text fragment of the tagged text frame. Thus, attribute module 266 preserves styling of the text frame when text is inserted as a text fragment into the text frame, by applying styling attributes of the text frame determined by typography module 256. By applying attributes to a tagged text frame, attribute module 266 generates a styled text frame. Attribute module 266 provides a styled text frame to display module

268. In one example, a styled text frame provided by attribute module 266 includes a styled text frame inserted into a document layout.

Link module 260 receives a path corresponding to an asset from text acquisition module 254, and an indication of a tag from text placement module 258 (e.g., a data structure including data of text inserted into a text fragment, such as a text fragment identifier, a number of characters in a text fragment, a date of insertion, and the like). Link module 260 may also receive a representation of text from text acquisition module 254, logical structure module 264, or any suitable module of system 300. Examples of a representation of text include a name of a metadata field from which the text is obtained, the text itself (in part or in whole), a coded version of the text, a node name in a logical structure for the text, and the like. Using these received items, link module 260 creates a link for a text fragment. A link allows an asset from which content (e.g., text) is linked to be located, and also to determine a status of linked content relative to its source asset.

Link module 260 forms a link in any suitable way. In one example, link module 260 creates a link for a text fragment by binding a representation of text and a path of an asset. Binding can include concatenating terms into a string. For instance, a link may include a pathname concatenated with a name of a metadata field. Concatenation can include inserting delineators between terms, such as inserting a colon between a pathname and a name of a field. Additionally or alternatively, a link for a text fragment can be generated by binding information of a node in a logical structure to a location of an asset. The information of the node in the logical structure may include or refer to a metadata field, such as including a name of a metadata field. Additionally or alternatively, information of the node in the logical structure may include or refer to a locator of text in an asset, such as a page number, line number, character number, coordinate (e.g., Cartesian coordinate in a scan of an image), combinations thereof, and the like.

Link module 260 provides a link to display module 268, logical structure module 264, and to update module 262. Link module 260 can maintain links in a link list, with links grouped in the list in any suitable way, such as alphabetically, according to status, date (e.g., when the link was created), and the like.

Logical structure module 264 receives a path from text acquisition module 254 and a link from link module 260, and generates and maintains a logical structure of a document. Logical structure module 264 can receive any suitable signal in system 300 to generate and maintain a logical structure of a document. In one example, logical structure module 264 generates and maintains an XML logical structure. A logical structure of logical structure module 264 includes a complete description of a document, in that it can be used to reproduce a document and document layout. Additionally or alternatively, a logical structure of logical structure module 264 includes a node for each text fragment of a document layout that has content linked to an asset. Moreover, a logical structure of logical structure module 264 can include a node for each field of an asset (e.g., metadata field) that has content linked to a text fragment in a document layout. Logical structure module 264 provides a logical structure to display module 268.

Display module 268 receives a logical structure from logical structure module 264, status indicators from update module 262, and a styled text frame from attribute module 266. Furthermore, display module 268 can receive any object used by or generated by system 300, such as a document layout, assets, content of assets (e.g., images, text, and the like), positions, locations, text frames, text fragments, and the like. Display module 268 generates a user interface and exposes any suitable object it receives in the user interface (discussed in more detail below). A user interface can be exposed on any suitable display.

Update module 262 checks for updates to links and linked content in a document layout, and provides statuses of links to system 300. Accordingly, update module 262 can provide instructions to any module of system 300 to cause any suitable outcome, such as generate a warning, repair a link automatically, direct a user to repair a link, and the like. For instance, when a link is stale (e.g., the link is broken, or content has been modified or moved), update module 262 notifies system 300 so that system 300 can take appropriate action, including providing warning messages when a document layout is used that contains a stale link, and configuring system 300 to update stale links and modified or moved content. In one example, update module 262 generates instructions for display module 268 to indicate a link is stale in a user interface responsive to update module 262 determining the link is stale.

System 300 constitutes an improvement over systems that do not distinguish between text fragments with constant content and text fragments with variable content within a text frame. By supporting multiple text fragments within a text frame of both constant content and variable content, content of an asset is inserted into a text fragment while preserving the styling of the text frame. Thus, manual efforts associated with reapplying styling attributes are avoided with system 300, unlike systems that do not distinguish between text fragments with constant content and text fragments with variable content within a text frame. Furthermore, when text of a text fragment is updated in system 300, the text frame does not need to be re-typeset by rearranging text fragments relative to one another, since linked text fragments can be defined within the text frame, rather than being split into multiple text frames that may require rearrangement after update.

Having considered an example system 300, consider now a discussion of example user interfaces in accordance with one or more aspects of the disclosure.

Example User Interfaces

Figure 4:
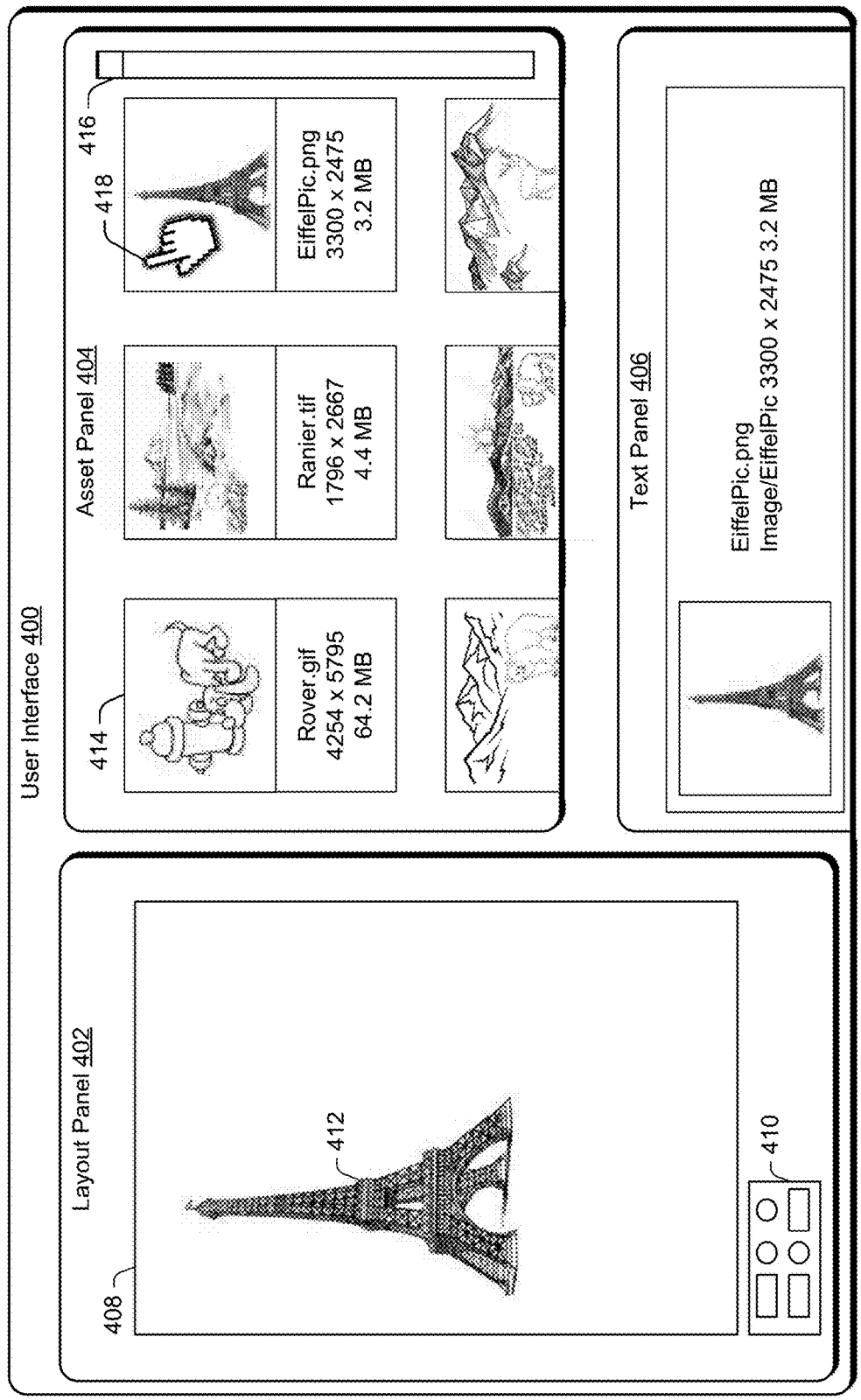
FIG. 4 illustrates an example user interface in accordance with one or more aspects of the disclosure.

FIG. 4 illustrates an example user interface 400 in accordance with one or more aspects of the disclosure. In FIG. 4, example user interface 400 includes three data panels, discussed below. However, user interface 400 can include any suitable number and type of data panels to display text, metadata, assets, links, a document layout, a logical structure, and the like. User interface 400 is an example of a user interface generated by system 300 in FIG. 3 and displayed on display 230 in FIG. 2. Hence, a device displaying user interface 400 can be any suitable device, such as one of devices 204 in FIG. 2.

User interface 400 includes layout panel 402, asset panel 404, and text panel 406. Layout panel 402 includes document layout 408 and controls 410, suitable to control document layout 408 and its content. Controls 410 can include any suitable control, such as adjusters for brightness, contrast, color, selection of filters, shading, crop, overlay, import, export, font type, size and color, selection of representations of tags (e.g., different bracket choices, colors of brackets, etc.), zoom, and the like. In the example in FIG. 4, layout panel 402 also includes an image 412, depicting the Eiffel Tower.

Asset panel 404 displays representations of assets, such as thumbnail images of assets on a server database (e.g., assets 228 in FIG. 2). Representations 414 in asset panel 404 depict a plurality of images (e.g., a dog and a fire hydrant, various landscapes with various animals, and the Eiffel Tower). Furthermore, representations 414 can be displayed with data of the asset, such as a filename, pixel dimensions, and file size. Representations 414 can be searched and scrolled through using a scroll bar 416 of asset panel 404. For instance, by sliding a control of scroll bar 416 up and down, representations 414 of assets in asset panel 404 are scrolled up and down, respectively, so that different representations are exposed in asset panel 404. Accordingly, some representations 414 in asset panel 404 are displayed in part in FIG. 4 (e.g., they are partially hidden) and can be viewed in full by manipulating scroll bar 416. Though FIG. 4 depicts representations 414 that depict images, representations 414 can depict any suitable asset, such as a document, a video, an animation, a map, an audio recording, and the like.

In the example in FIG. 4, one of representations 414 has been selected, indicated by indicator 418. For instance, indicator 418 denotes a user selection of the asset having a filename "EiffelPic.png", with a representation of the Eiffel Tower. In response to a selection of this asset, indicated by indicator 418, image 412 is inserted into document layout 408. For instance, image 412 can be inserted into document layout 408 at a location selected by a user. In one example, a user drags one of representations 414 into document layout 408 and positions the image within document layout 408 to insert the image into document layout 408. As a result of inserting an image (e.g., image 412) into document layout 408, a link for the image can be created, linking the content (e.g., the image) to a location of the asset containing the content.

In the example in FIG. 4, text panel 406 is displayed in part (and is discussed in subsequent figures in more detail). In one example, text panel 406 is exposed in user interface 400 responsive to a user selection of one of representations 414.

Figure 5:
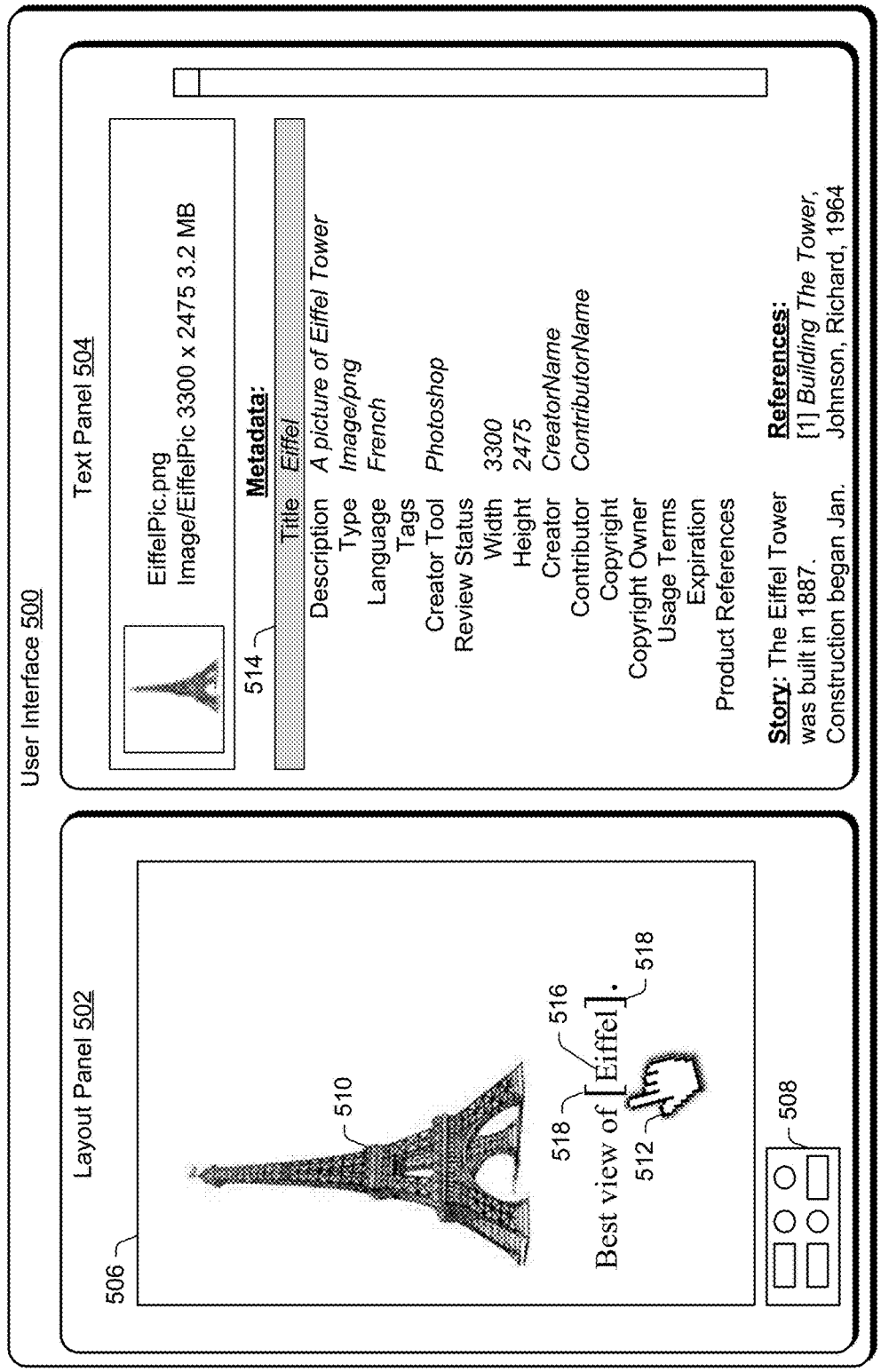
FIG. 5 illustrates an example user interface in accordance with one or more aspects of the disclosure.

FIG. 5 illustrates an example user interface 500 in accordance with one or more aspects of the disclosure. In FIG. 5, example user interface 500 includes two data panels, discussed below. However, user interface 500 can include any suitable number and type of data panels to display any suitable type of data. User interface 500 is an example of a user interface generated by system 300 in FIG. 3 and displayed on display 230 in FIG. 2. Hence, a device displaying user interface 500 can be any suitable device, such as one of devices 204 in FIG. 2.

User interface 500 includes layout panel 502 and text panel 504, which are examples of layout panel 402 and text panel 406 in FIG. 4, respectively. Layout panel 502 includes document layout 506 and controls 508, which are examples of document layout 408 and controls 410 in FIG. 4, respectively. The example illustrated by user interface 500 in FIG. 5 continues the example illustrated by user interface 400 in FIG. 4.

Document layout 506 includes image 510, an image inserted into document layout 506 and corresponding to the asset whose text is displayed in text panel 504. Document layout 506 also includes indicator 512, which denotes a position in document layout 506. For instance, indicator 512 can represent a user selection, such as a mouse click, a touch on a touch screen, and the like. In the example in FIG. 5, indicator 512 is placed at a location after the text fragment "Best view of". In one example, a user has typed the text fragment "Best view of" to create a text fragment of a text frame, and selected a next cursor position as a location in the text frame indicated by indicator 512.

Text panel 504 displays text of an asset (e.g., an asset selected by a user). Text panel 504 can display any suitable text of an asset, such as a story, chapter, page, data (e.g., metadata), spreadsheet, and the like. Continuing the example from FIG. 4, text panel 504 in FIG. 5 displays text for the asset with filename EiffelPic.png, including metadata of various field names and content, a story (displayed in part), and references (displayed in part). Text displayed in text panel 504 can be displayed in any suitable order, rearranged (e.g., by being dragged and dropped), moved within text panel 504 (e.g., using a scroll bar of text panel 504), and adjusted (e.g., to increase and decrease font size).

In the example in FIG. 5, a story displayed in part in the bottom left corner of text panel 504 describes construction of the Eiffel Tower, and references are displayed in part in the bottom right corner of text panel 504 that enumerate citations from the story, including a book entitled "Building the Tower" from 1964. Text panel 504 also displays metadata, including a plurality of metadata fields, "Title", "Description", "Type", "Language", etc., each having respective content. For instance, the content of the metadata field named "Title" is the text "Eiffel". Indicator 514 denotes that metadata field named "Title" has been selected, such as by a user clicking with a mouse on or tapping with a stylus on the metadata field.

Responsive to the metadata field named "Title" being selected in text panel 504, as indicated by indicator 514, the content of the metadata field named "Title" has been inserted into text fragment 516 of document layout 506 in the layout panel 502 at the location indicated by indicator 512. Furthermore, attributes of the position indicated by indicator 512 have been applied to the text of the metadata field named "Title" inserted into text fragment 516. Accordingly, a text frame includes a first text fragment of constant content "Best view of" and second text fragment with variable content "Eiffel" (e.g., text fragment 516) of the same style attributes. For instance, the text "Eiffel" from the metadata field "Title" indicated by indicator 514 has been inserted into a text fragment with the same style font and font size as the text "Best view of" in document layout 506.

Furthermore, responsive to content of the metadata field named "Title" of the asset with filename "EiffelPic.png" being inserted into text fragment 516, a link is created that binds the metadata field named "Title" with a location of the asset with filename "EiffelPic.png". To denote that text fragment 516 includes linked content, text fragment 516 is illustrated in document layout 506 as encapsulated by brackets 518. Brackets 518 are an example of an indicator of tagging to denoted linked content. In on example, controls 508 includes options for indicating linked content, such as brackets, shading, color, boxes, circles, ellipses, and the like.

Though metadata text of text panel 504 is indicated as selected by indicator 514 and inserted into text fragment 516, text can be selected from any text of text panel 504, such as text of a story, references, and the like, and inserted into a text fragment of document layout 506. Metadata text is used in FIG. 5 by way of example and not limitation.

Figure 6:
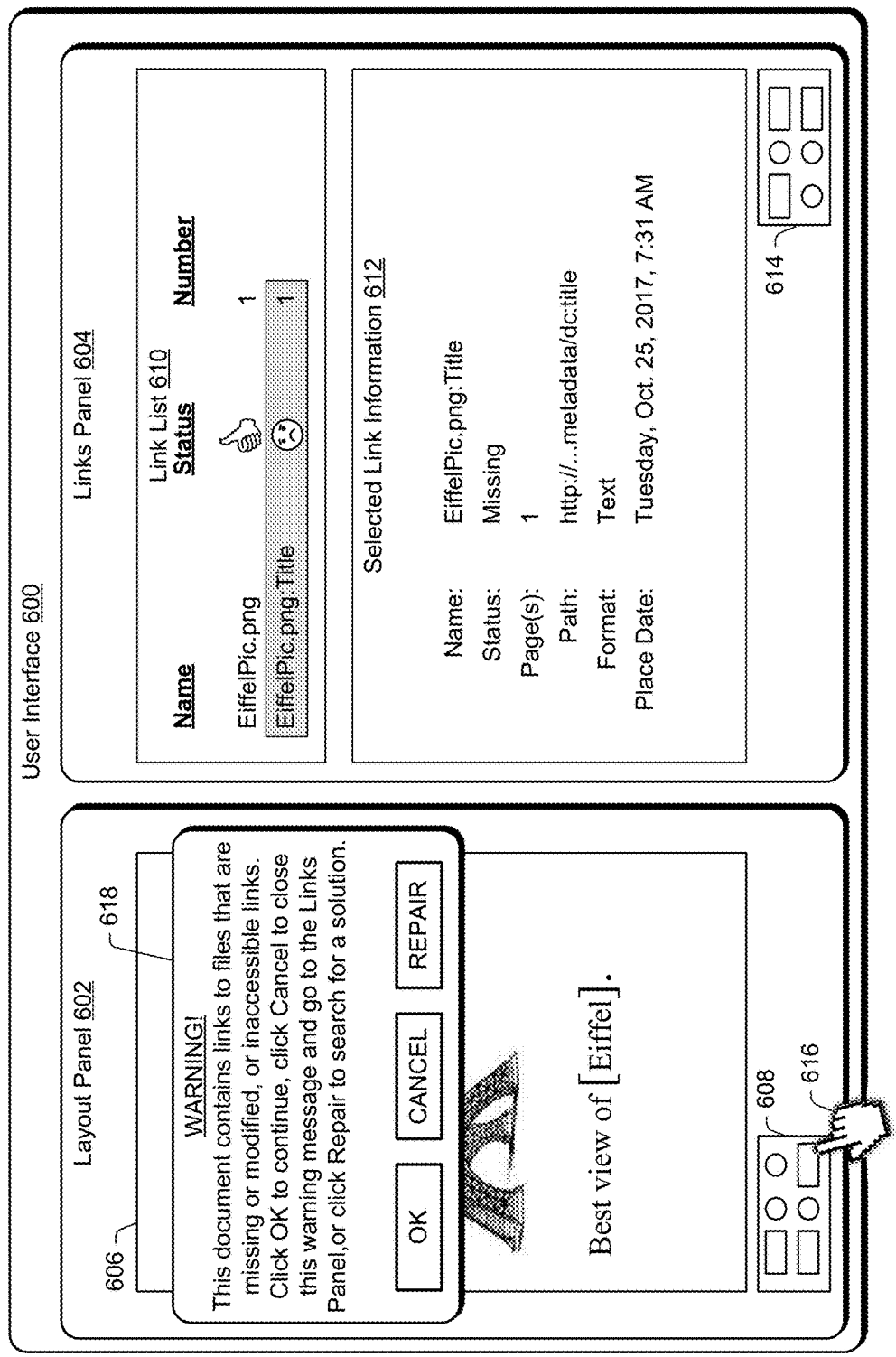
FIG. 6 illustrates an example user interface in accordance with one or more aspects of the disclosure.

FIG. 6 illustrates an example user interface 600 in accordance with one or more aspects of the disclosure. In FIG. 6, example user interface 600 includes two data panels, layout panel 602 and links panel 604. However, user interface 600 can include any suitable number and type of data panels to display any suitable type of data. User interface 600 is an example of a user interface generated by system 300 in FIG. 3 and displayed on display 230 in FIG. 2. Hence, a device displaying user interface 500 can be any suitable device, such as one of devices 204 in FIG. 2.

User interface 600 includes layout panel 602, which is an example of layout panel 402 in FIG. 4 and layout panel 502 in FIG. 5. Layout panel 402 includes document layout 606 and controls 608, which are examples of document layout 408 and controls 410 in FIG. 4, respectively. The example illustrated by user interface 600 in FIG. 6 continues the examples illustrated by user interface 400 in FIG. 4 and user interface 500 in FIG. 5.

Links panel 604 exposes links and information regarding links. In the example in FIG. 6, links panel 604 includes a link list 610, selected link information 612, and controls 614. Link list 610 displays a list of links of text fragments in document layout 606. In the example in FIG. 6, link list 610 displays two links, one entitled "EiffelPic.png" for an image of the Eiffel Tower inserted into document layout 606, and another entitled "EiffelPic.png:Title" for the text fragment with variable content "Eiffel" in document layout 606, as previously described.

Furthermore, links panel 604 displays a status indicator for each link in link list 610. Link list 610 can display any suitable status indicator, such as text, emoticons, symbols, color variations, pattern variations, font variations, bold, italic, and the like, to denote a status. Statuses can include any suitable status, such as up-to-date, stale (e.g., not up-to-date), missing content, moved content, and the like. In the example in FIG. 6, the link entitled "EiffelPic.png" is depicted with a thumbs-up designator to denote that the link is up-to-date, and the link entitled "EiffelPic.png:Title" is depicted with a frown-face designator to denote that the link is stale.

Moreover, the name of the link can include a name of the asset (e.g., "EiffelPic.png") and a name of the metadata field whose content is linked (e.g., "Title"), in any suitable way. In the example in FIG. 6, a name of the asset (e.g., "EiffelPic.png") is concatenated with a name of the metadata field whose content is linked (e.g., "Title"), with the two names separated by a designator (e.g., a colon) to create the link "EiffelPic.png: Title".

Controls 614 can be used to edit and configure links panel 604 and data displayed in links panel 604 in any suitable way, including display parameters, such as brightness, contrast, color, selection of filters, shading, font type, size and color, selection of representations of status indicators (e.g., text versus symbols), zoom, and the like.

Selected link information 612 displays information regarding a link selected in link list 610. Selected link information 612 can display any suitable information regarding a selected link. In the example in FIG. 6, the link entitled "EiffelPic.png:Title" is selected, indicated by highlight in link list 610, and selected link information 612 displays a name of the link, a status of the link, page numbers of document layout 606 on which content of the link is inserted, a path of the link, a format of the link, and a date the link was created (e.g., when content was placed into document layout 606).

As evidenced by the frown-face in link list 610, the status of the link entitled "EiffelPic.png:Title" in selected link information 612 is further denoted as "Missing". Because the status is other than up-to-date, when a user performs certain actions on document layout 606, such as actions where the document is used by another application or device (e.g., printing, attaching the document to an email, uploading the document to a server, and the like) a warning message can be displayed. In the example in FIG. 6, a user selects an action for document layout 606 in controls 608, denoted by indicator 616 (e.g., to print the document).

Responsive to the user selection denoted by indicator 616, warning message 618 is displayed in user interface 600.

Warning message 618 can announce any suitable warning, and provide any suitable options for a user to take. In the example in FIG. 6, warning message 618 announces "This document contains links to files that are missing or modified, or inaccessible links" and provides three options for a user to take, "Click OK to continue, click Cancel to close this warning message and go to the Links Panel, or click Repair to search for a solution." Hence, a user pay proceed without repairing a broken or stale link (e.g., by clicking "OK") or close the warning message and go to links panel 604, where the problem can be fixed, such as by directly editing a broken link. For instance, the problem may be a typo in a path that can be remedied via editing the selected link information 612, accessing one of controls 614, and the like.

Furthermore, a user may try to automatically solve the problem (e.g., by clicking "Repair") in warning message 618. In this case, a document typography system (e.g., system 300 with update module 262 in FIG. 3) searches for an update to a broken or stale link, such as by obtaining updated content from a metadata field of an asset, obtaining a location where an asset has moved, and the like, and automatically updates document layout 606 and links in links panel 604 based on the update and information obtained. A message reporting success or failure of the repair can be reported in user interface 600 (not shown).

Figure 7:
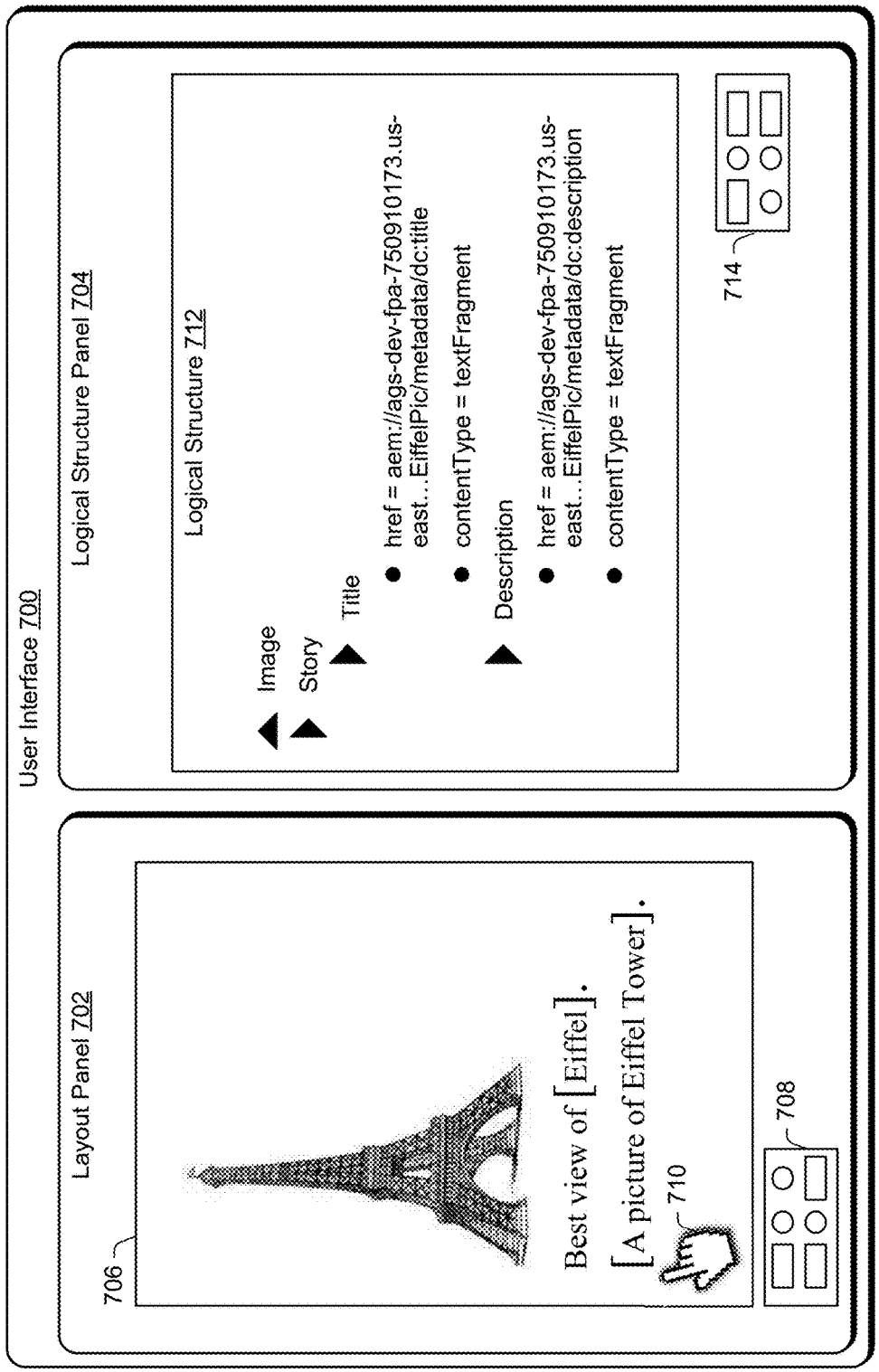
FIG. 7 illustrates an example user interface in accordance with one or more aspects of the disclosure.

FIG. 7 illustrates an example user interface 700 in accordance with one or more aspects of the disclosure. In FIG. 7, example user interface 700 includes two data panels, layout panel 702 and logical structure panel 704. However, user interface 700 can include any suitable number and type of data panels to display any suitable type of data. User interface 700 is an example of a user interface generated by system 300 in FIG. 3 and displayed on display 230 in FIG. 2. Hence, a device displaying user interface 700 can be any suitable device, such as one of devices 204 in FIG. 2.

User interface 700 includes layout panel 702, which is an example of layout panel 402 in FIG. 4, layout panel 502 in FIG. 5, and layout panel 602 in FIG. 6. Layout panel 402 includes document layout 706 and control 708, which are examples of document layout 408 and controls 410 in FIG. 4, respectively. The example illustrated by user interface 700 in FIG. 7 continues the examples illustrated by user interface 400 in FIG. 4, user interface 500 in FIG. 5, and user interface 600 in FIG. 6.

In the example in FIG. 7, a user has indicated a location in document layout 706, denoted by indicator 710. For instance, indicator 710 denotes a position in document layout 706 within the text frame including a first text fragment with constant content "Best view of" and a second text fragment with variable content "Eiffel", as previously discussed. At a location denoted by indicator 710, a third text fragment has been created within the text frame by inserting the text "A picture of Eiffel Tower", which is linked content, as evidenced by tag representations of hard brackets. For instance, the text "A picture of Eiffel Tower" is content of a metadata field entitled "Description" for the asset with filename "EiffelPic.png" (refer momentarily to text panel 504 in FIG. 5, which illustrates a "Description" metadata field with content "A picture of Eiffel Tower"). In FIG. 7, a text fragment has been created at a location indicated by indicator 710 for this "Description" metadata field, such as by methods previously described.

Accordingly, logical structure panel 704 exposes logical structure 712 corresponding to document layout 706. Logical structure 712 includes a hierarchy of nodes. For instance, logical structure 712 includes a node for an image (e.g., for an image of the Eiffel Tower inserted into document layout 706), and this node is denoted as closed by an upwards triangle (so that sub-nodes of the image node are not viewable). Logical structure 712 also includes nodes for each of the text fragments with linked content in document layout 706. For instance, logical structure includes a node entitled "Title", which corresponds to the metadata field of the same name having content "Eiffel", and a node entitled "Description", which corresponds to the metadata field of the same name having content "A picture of Eiffel Tower".

Nodes of logical structure 712 can contain any suitable number and type of sub-nodes. For instance, sub-nodes of "Title" and "Description" nodes of logical structure 712 have sub-nodes designating a link (e.g., a path that includes an asset location concatenated with a name of a metadata field), and a content type that designates a type of content, such as text, an image, emoticon, animation, symbol, and the like.

Logical structure panel 704 also includes controls 714. Controls 714 can be used to edit and configure logical structure panel 704 and data displayed in logical structure panel 704 in any suitable way, including display parameters, such as brightness, contrast, color, selection of filters, shading, font type, size and color, zoom, and the like. In one example, controls 714 can be used to edit the logical structure (e.g., change a pathname or other information of a node) and affect a change within document layout 706, such as to insert text and create a new text fragment by adding a new node to logical structure 712 and populating its contents, and the like.

Having considered example user interfaces, consider now a discussion of example procedures for inserting linked text fragments in a document layout of a document in accordance with one or more aspects of the disclosure.

Example Procedures

Figure 8:
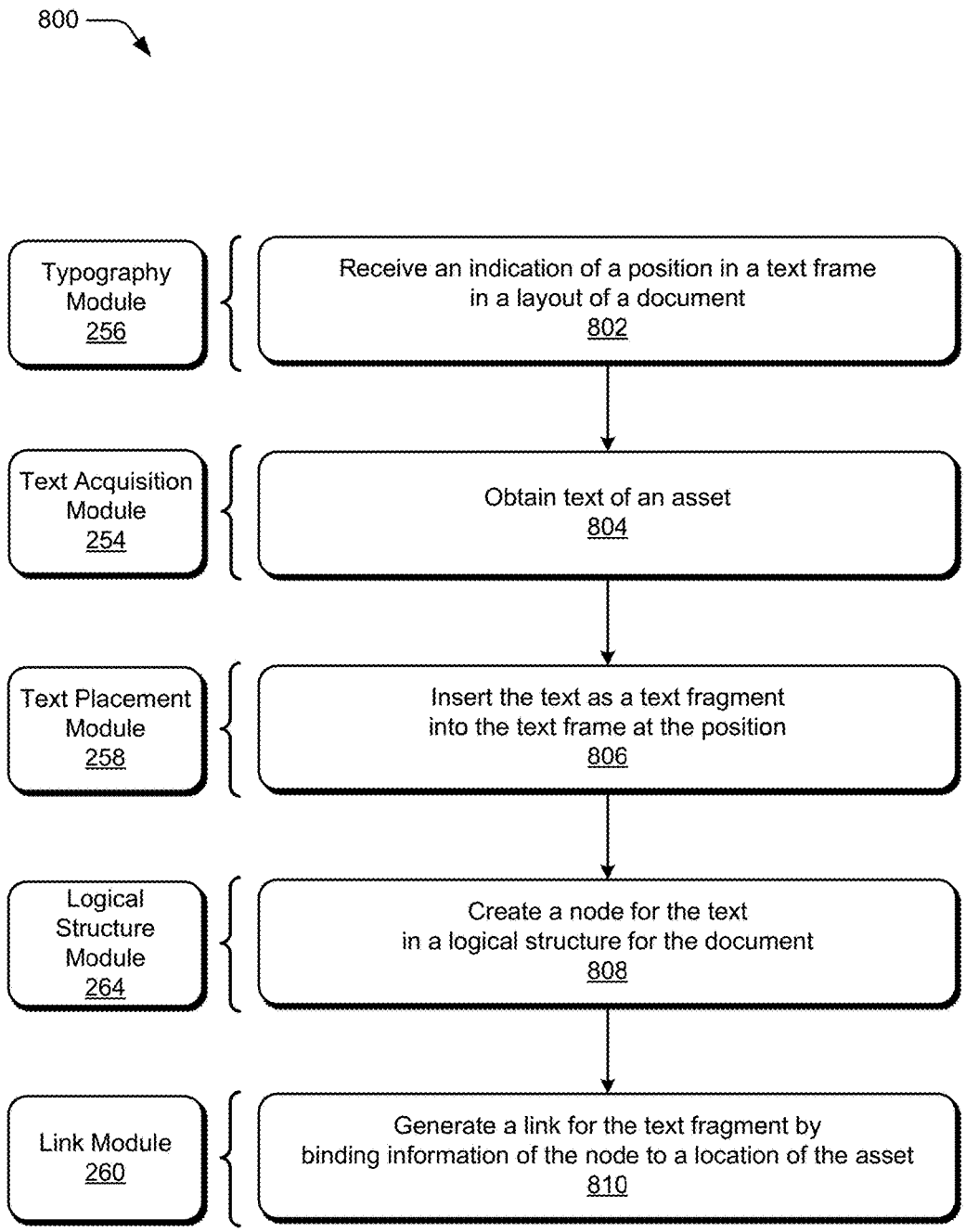
FIG. 8 illustrates a flow diagram depicting an example procedure in accordance with one or more aspects of the disclosure.

FIG. 8 illustrates an example procedure 800 for inserting linked text fragments in a document layout of a document in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 224 of FIG. 2 that makes use of a document typography system, such as system 300 or document typography system 208. A document typography system implementing procedure 800 may be an independent application that has been installed on the computing device, a service hosted by a service provider that is accessible by the computing device, a plug-in module to the computing device, or combinations thereof.

An indication of a position in a text frame in a layout of a document is received (block 802). In one example, typography module 256 receives an indication of a position in a text frame in a layout of a document. Receiving an indication of a position can include receiving a range of selected text, such as a highlighted range of text. An indication of the position can denote where to create a new text frame in the layout. The text frame can be newly created responsive to receiving an indication of a position in a layout of a document. In one example, a text frame includes a plurality of linked text fragments and a plurality of constant text fragments.

Text of an asset is obtained (block 804). Any suitable text of an asset can be obtained, such as text in a story of an asset, such as in a chapter of a book, bibliography, or table of contents, text in a metadata field of an asset (e.g., metadata text), text in a spreadsheet, text in a table or database, text populating a data structure, text scanned into an image, text on a receipt, map coordinates, and the like. In one example, text acquisition module 254 obtains text from a metadata field of an asset (e.g., metadata text). For instance, the asset can be an image on a server, such as a stock image on a database of images, and the metadata text can be included in a metadata field of the image. Text can be user-selected text, such as text designated by user selection of a field (e.g., metadata field), text designated by a user in a document, book, file, computer code, and the like.

The text is inserted as a text fragment into the text frame at the position (block 806). In one example, text placement module 258 inserts the text as a text fragment into the text frame at the position. Additionally or alternatively, inserting text includes applying attributes of the location to the text. Inserting text can include tagging the text with a representation indicating boundaries of the text fragment, such as with brackets than indicate a start and stop location of the text fragment.

A node for the text is created in a logical structure for the document (block 808). In one example, logical structure module 264 creates a node for the text in a logical structure for the document. A node of a logical structure can be named according to the text, such as with a name or other indicator of a metadata field of an asset that includes the text, with a representation of the text (e.g., an indicator of the text in a table of linked text fragments), with the text itself, in part or in whole, and the like.

A link for the text fragment is generated by binding information of the node to a location of the asset (block 810). In one example, link module 260 generates a link for the text fragment by binding information of the node to a location of the asset. Information of the node can be any suitable information, such as a name of the node, a name of a metadata field represented by the node, a representation of text included in the text fragment (e.g., the text itself, a coded version of the text, a designator of the text usable to retrieve the text), and the like. Additionally or alternatively, a link includes a filename of an asset, such as a text string including a filename of an asset concatenated with a location of the asset.

In one example, a status of a link is requested, such as by update module 262. A link can be displayed in a user interface with a respective status indicator for one of missing, modified, or up-to-date statuses based on requesting the status, e.g., based on results received in response to requesting a link status. Additionally or alternatively, an option to update the link can be displayed when the status is missing or modified. In one example, responsive to receiving a request to use a document outside a typography application (e.g., to print or export a document), a warning is displayed when the status is missing or modified. For instance, a logical structure for a first document can be exported from one typography application to a different document of another typography application. The different document can be a reproduction of the first document. Additionally or alternatively, the different document can be a document that includes a reproduction of the first document (e.g., the different document can be a slide show presentation and the first document is one slide of the slide show).

Figure 9:
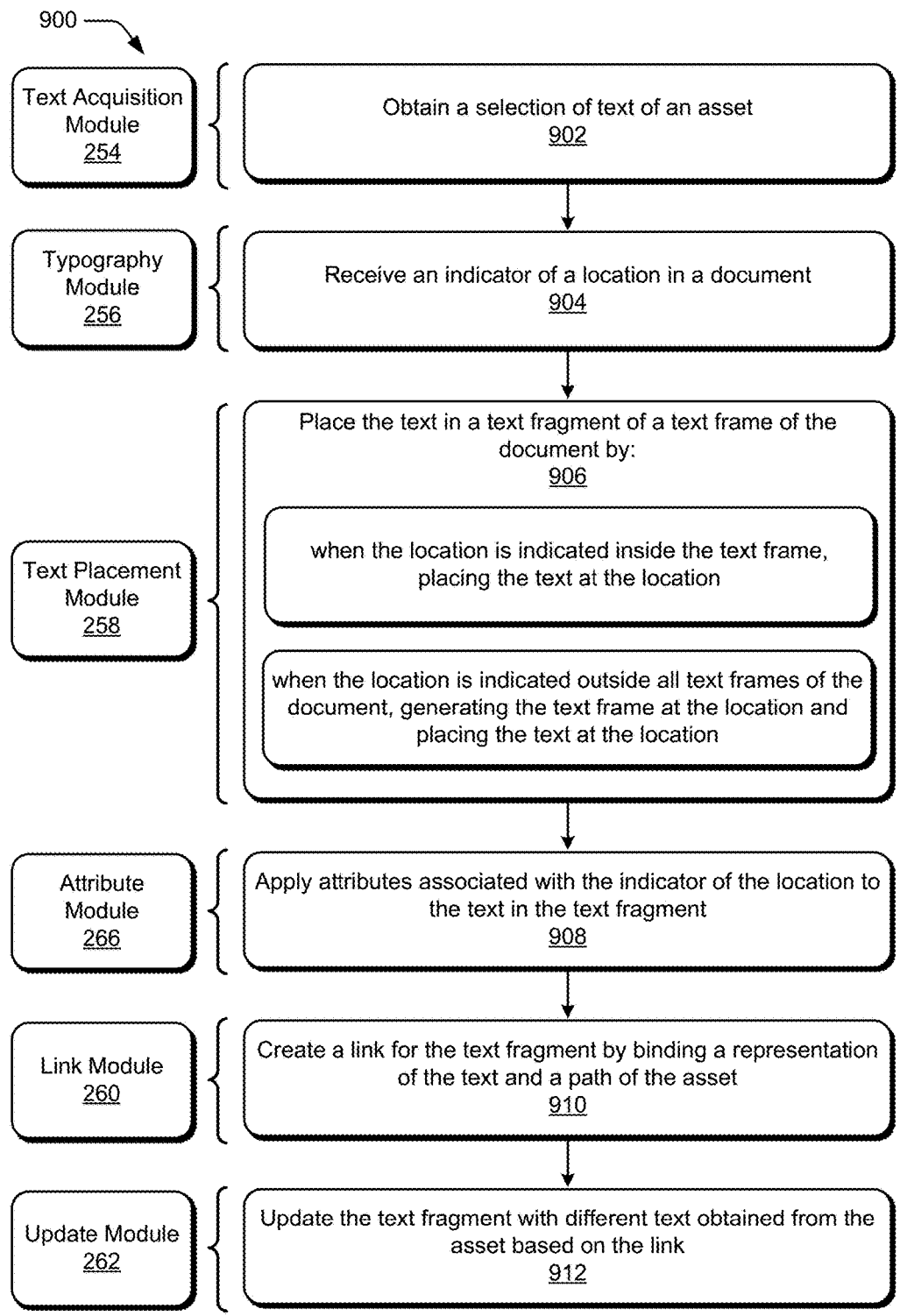
FIG. 9 illustrates a flow diagram depicting an example procedure in accordance with one or more aspects of the disclosure.

FIG. 9 illustrates an example procedure 900 for inserting linked text fragments in a document layout of a document in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 224 of FIG. 2 that makes use of a document typography system, such as system 300 or document typography system 208. A document typography system implementing procedure 900 may be an independent application that has been installed on the computing device, a service hosted by a service provider that is accessible by the computing device, a plug-in module to the computing device, or combinations thereof.

A selection of text of an asset is obtained (block 902). In one example, text acquisition module 524 obtains a selection of text of an asset. Any suitable selection of any suitable text can be obtained. For instance, text can be text included in data of an asset for consumption, such as a news story, book, map, spreadsheet, and the like. Furthermore, text can be included in a field of an asset, such as a metadata field, a title field, a display field, a field of a data structure (e.g., a table indicating encoding parameters of an asset or a communication link used to communicate or obtain the asset), an entry in a timeline (e.g., a timestamp in a video sequence), and the like. An example of a selection of text of an asset is a user selection, such as with a mouse click, of text of a metadata field displayed in a list of metadata fields of the asset in a user interface. In one example, text of an asset (e.g., a list of metadata fields, metadata, a news story, a book chapter, a document, a spreadsheet, and the like) is displayed responsive to a user selection of the asset among a plurality of assets in the user interface.

An indicator of a location in a document is received (block 904). In one example, typography module 256 receives an indicator of a location in a document. For instance, a user may indicate a location in a document layout with a mouse click, keyboard, or stylus.

Text is placed in a text fragment of a text frame of the document (block 906). In one example, text placement module 258 places text in a text fragment of a text frame of the document. Text can be placed in a text fragment of a text frame of the document by: when the location is indicated inside the text frame, placing the text at the location; and when the location is indicated outside all text frames of the document, generating the text frame at the location and placing the text at the location. A text frame can include a plurality of text fragments, each text fragment associated with a respective link that binds a respective representation of text (e.g., a name of a metadata field from which the text is obtained, the text itself, a coded version of the text, a node for the text in a logical structure, and the like) and a respective asset location.

Attributes associated with the indicator of the location are applied to the text in the text fragment (block 908). In one example, attribute module attributes associated with the indicator of the location to the text in the text fragment. Attributes can be any suitable attributes, such as font type, size, color, bold, italics, superscript, subscript, and the like.

A link for the text fragment is created by binding a representation of text and a path of the asset (block 910). In one example, link module 260 creates a link for the text fragment by binding a representation of the text and a path of the asset. A representation of text can be any suitable representation, such as a name of a metadata field from which the text is obtained, an indicator of a metadata field (such as a number of the metadata field in an enumerated list of metadata fields), an encoded version of a representation of the metadata field, a node for the text in a logical structure, the text itself, and the like.

The text fragment is updated with different text obtained from the asset based on the link (block 912). In one example, update module 262 updates the text fragment with different text obtained from the asset based on the link. For instance, update module 262 can obtain a status and instruct a document typography system to update a document layout by updating a text fragment based on the status (e.g., when content is moved, missing, or a link is broken). In one example, update module 262 determines a status of a link including one of modified, missing, or up-to-date. A status can be exposed in a user interface that can display the status in any suitable way. Additionally or alternatively, a link can be displayed among a plurality of links representing a respective text fragment, and, responsive to a user selection of a one of the plurality of links, text can be displayed corresponding to the respective text fragment, such as text of a metadata field in which the text of the text fragment was obtained.

Figure 10:
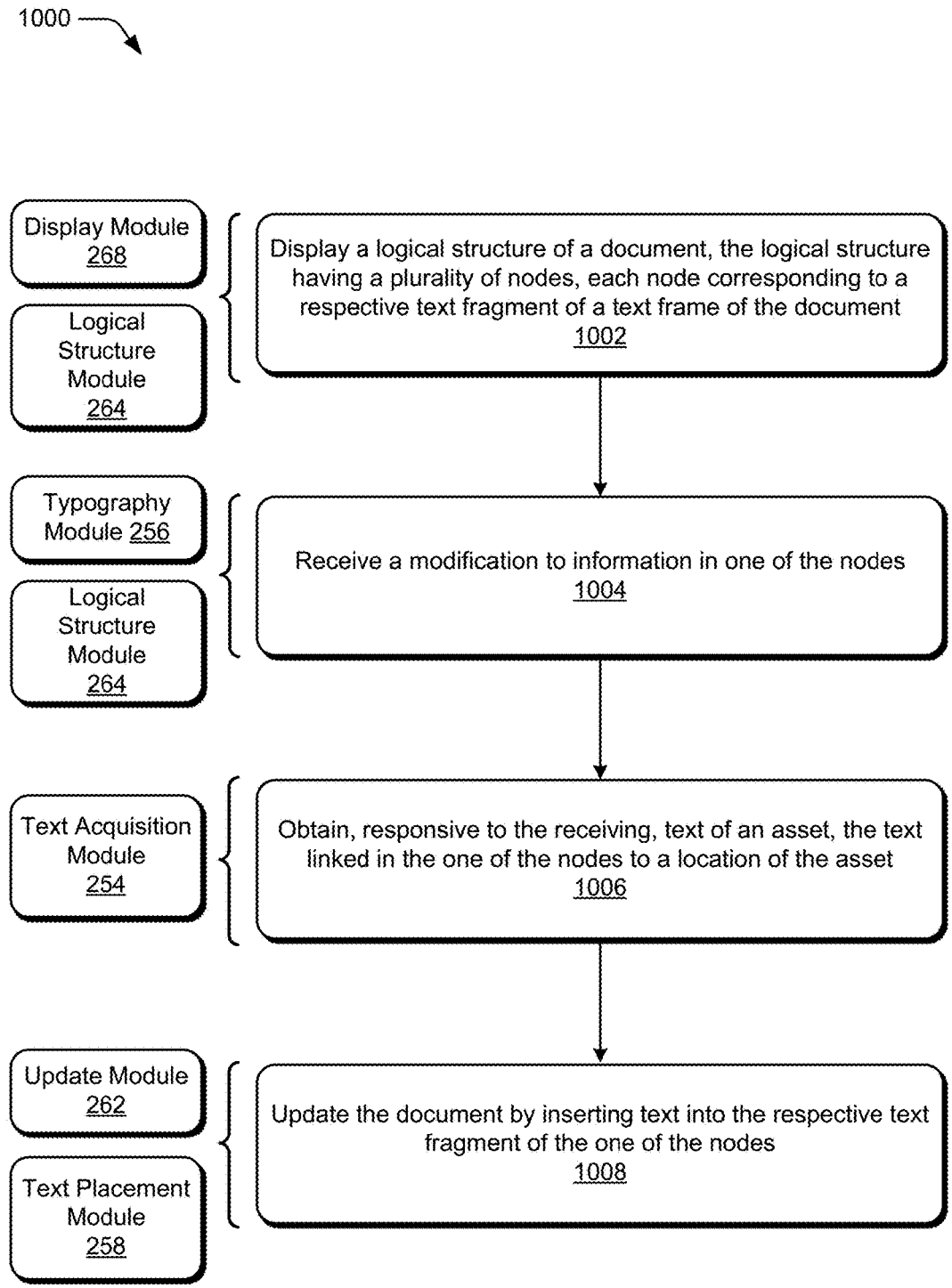
FIG. 10 illustrates a flow diagram depicting an example procedure in accordance with one or more aspects of the disclosure.

FIG. 10 illustrates an example procedure 1000 for inserting linked text fragments in a document layout of a document in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 204 or server 224 of FIG. 2 that makes use of a document typography system, such as system 300 or document typography system 208. A document typography system implementing procedure 1000 may be an independent application that has been installed on the computing device, a service hosted by a service provider that is accessible by the computing device, a plug-in module to the computing device, or combinations thereof.

A logical structure of a document is displayed (block 1002). The logical structure has a plurality of nodes, each node corresponding to a respective text fragment of a text frame of the document. In one example, logical structure module 264 and display module 268 work in conjunction to expose a user interface with the logical structure. The logical structure can be an XML structure.

A modification to information in one of the nodes is received (block 1004). In one example, logical structure module 264 and typography module 256 work in conjunction to receive a modification to information in one of the nodes. For instance, receiving the modification can include receiving the modification as a user edit to the logical structure, such as a user directly editing the logical structure. Additionally or alternatively, a layout of the document can be displayed, and a user edit can be obtained in the layout of the document. A modification to information in one of the nodes of the logical structure can be received responsive to obtaining the user edit in the layout of the document.

Responsive to the receiving, text of an asset is obtained (block 1006). The text is linked in the one of the nodes to a location of the asset. For instance, the text can be included in a metadata field of the asset, and the one of the nodes can link the metadata field to the location of the asset. In one example, text acquisition module 254 obtains text of an asset linked in the one of the nodes to a location of the asset. The text and asset can be obtained in any suitable way, such as by user selection of the text in the asset, a user selection of the asset, and the like. The asset and text of the asset can be obtained from a database of assets, such as a database of stock images, a user's personal image library, and the like.

The document is updated by inserting the text from into the respective text fragment of the one of the nodes (block 1008). In one example, text placement module 258 and update module 262 work in conjunction to update a document by inserting text (e.g., text obtained from a metadata field of an asset) into the respective text fragment of the one of the nodes, as described above. Additionally or alternatively, text inserted into the respective text fragment is tagged with a representation indicating boundaries of the respective text fragment, such as brackets that encapsulate the text fragment.

The procedures described herein constitute an improvement over procedures that do not distinguish between text fragments with constant content and text fragments with variable content within a text frame. By supporting multiple text fragments within a text frame of both constant content and variable content, the procedures described herein insert content of an asset into a text fragment while preserving the styling of the text frame. Thus, manual efforts associated with reapplying styling attributes are avoided with the procedures described herein, unlike procedures that do not distinguish between text fragments with constant content and text fragments with variable content within a text frame. Furthermore, when text of a text fragment is updated in the procedures described herein, the text frame does not need to be re-typeset by rearranging text fragments relative to one another, since linked text fragments can be defined within the text frame, rather than being split into multiple text frames that may require rearrangement after update.

Having considered example procedures in accordance with one or more implementations, consider now example systems and devices that can be utilized to practice the inventive principles described herein.

Example Systems and Devices

FIG. 11 illustrates an example system generally at 1100 that includes an example computing device 1102 that is representative of one or more computing systems and devices that may implement the various techniques described herein. This is illustrated through inclusion of document typography system 208, system 300, document typography application 252, and document support system 226, which operate as described above. Computing device 1102 may be, for example, a user computing device (e.g., one of computing devices 104), or a server device of a service provider, (e.g., server 224). Furthermore, computing device 1102 may include an on-chip system, multiple computing devices, combinations thereof, or any other suitable computing device or computing system. Accordingly, FIG. 11 illustrates computing device 1102 as one or more of a tablet, a laptop computer, a smart phone, smart eye glasses, and a camera, though these examples are illustrative and in no way are meant to limit the type or number of devices included in computing device 1102.

The example computing device 1102 includes a processing system 1104, one or more computer-readable media 1106, and one or more I/O interfaces 1108 that are communicatively coupled to each other. Although not shown, computing device 1102 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 232 in FIG. 2 are an example of processing system 1104.

Computer-readable storage media 1106 is illustrated as including memory/storage 1112. Storage 234 in FIG. 2 is an example of memory/storage included in memory/storage 1112. Memory/storage component 1112 may include volatile media (such as random access memory (RAM)), nonvolatile media (such as read only memory (ROM), Flash memory, optical disks, magnetic disks, and so forth), or combinations thereof. Memory/storage component 812 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Computing device 1102 also includes applications 1114. Applications 1114 are representative of any suitable applications capable of running on computing device 1102, and may include a web browser which is operable to access various kinds of web-based resources (e.g., assets, media clips, images, content, configuration files, services, user profiles, and the like). Applications 1114 include document typography application 252, as previously described. Furthermore, applications 1114 includes any applications supporting document typography system 208, system 300, and document support system 226.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1110, or combinations thereof. Computing device 1102 may be configured to implement particular instructions and functions corresponding to the software and hardware modules. Accordingly, implementation of a module that is executable by computing device 1102 as software may be achieved at least partially in hardware, e.g., through use of computer-readable storage media and hardware elements 1110 of processing system 1104. The instructions and functions may be executable/operable by one or more articles of manufacture (for example, one or more computing devices 1102 or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1116 via a platform 1118 as described below.

Cloud 1116 includes and is representative of a platform 1118 for resources 1120. Platform 1118 abstracts underlying functionality of hardware (e.g., servers) and software resources of cloud 1116. Resources 1120 may include applications, data, or applications and data that can be utilized while computer processing is executed on servers that are remote from computing device 1102. Resources 1120 can also include services provided over the Internet, through a subscriber network, such as a cellular or Wi-Fi network, or combinations thereof. Resources 1120 can include asset store 1122, which stores assets, such as images, photographs (e.g., user images in a gallery, a database of stock photographs, and the like), document templates, user profile data, user image libraries, photographs posted in a shared photo service, metadata of assets, and the like, and may be accessed by computing device 1102.

Platform 1118 may abstract resources and functions to connect computing device 1102 with other computing devices. Platform 1118 may also serve to abstract scaling of resources to provide a corresponding level of scale to encountered demand for resources 1120 that are implemented via platform 1118. Accordingly, in an interconnected device embodiment, implementation of functionality described herein may be distributed throughout system 1100. For example, the functionality may be implemented in part on computing device 1102 as well as via platform 1118 that abstracts the functionality of cloud 1116.

CONCLUSION

In one or more implementations, a digital medium environment includes at least one computing device. Systems and techniques are described herein for inserting linked text fragments in a document layout of a document. By supporting multiple linked text fragments within a text frame, of both constant content and variable content, content of an asset is inserted into a text fragment while preserving the styling attributes of the text frame. Thus, manual efforts associated with reapplying styling attributes are avoided, unlike systems that do not distinguish between text fragments with constant content and text fragments with variable content within a text frame. Furthermore, a user interface is generated that exposes text of assets and a document layout.

Content of an asset (e.g., text) exposed via the user interface, once selected, is inserted into the document layout and exposed as a tagged text fragment, indicating the content is linked.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to typeset documents, a method implemented by a computing device having a typography application, the method comprising:
    receiving, by the computing device, an indication of a position in a text frame in a layout of a document;
    obtaining, by the computing device, text of an asset;
    inserting, by the computing device, the text as a text fragment into the text frame at the position;
    creating, by the computing device, a node for the text in a logical structure for the document;
    generating, by the computing device, a link for the text fragment by binding information of the node to a location of the asset;
    requesting, by the computing device, a status of the link; and
    displaying, by the computing device, the link with a respective status indicator for one of missing, modified, or up-to-date statuses based on the requesting.

2. The method as described in claim 1, wherein the receiving the indication of the position includes receiving a range of selected text.

3. The method as described in claim 1, wherein the indication of the position denotes where to create a new text frame in the layout and the text frame is newly created responsive to the receiving.

4. The method as described in claim 1, wherein the inserting the text includes applying attributes of the location to the text.

5. The method as described in claim 1, wherein the inserting the text includes tagging the text with a representation indicating boundaries of the text fragment.

6. The method as described in claim 1, wherein the text is included in a field of the asset and the node is named according to the field.

7. The method as described in claim 1, wherein the link includes a filename of the asset.

8. The method as described in claim 1, further comprising displaying an option to update the link when the status is missing or modified.

9. The method as described in claim 1, further comprising displaying, responsive to receiving a request to use the document outside the typography application, a warning when the status is missing or modified.

10. The method as described in claim 1, further comprising exporting the logical structure for the document to another document.

11. The method as described in claim 1, wherein the text frame includes a plurality of linked text fragments and a plurality of constant text fragments.

12. In a digital medium environment to typeset documents, a system comprising:
    a text acquisition module implemented at least partially in hardware of the computing device to obtain a selection of text of an asset;
    a typography module implemented at least partially in hardware of the computing device to receive an indicator of a location in a document;
    a text placement module implemented at least partially in hardware of the computing device to place the text in a text fragment of a text frame of the document by:
        when the location is indicated inside the text frame, placing the text at the location; and
        when the location is indicated outside all text frames of the document, generating the text frame at the location and placing the text at the location;
    an attribute module implemented at least partially in hardware of the computing device to apply attributes associated with the indicator of the location to the text in the text fragment;
    a link module implemented at least partially in hardware of the computing device to create a link for the text fragment by binding a representation of the text and a path of the asset;
    an update module implemented at least partially in hardware of the computing device to:
        update the text fragment with different text obtained from the asset based on the link; and
        determine a status of the link including one of modified, missing, or up-to-date; and
    a display module implemented at least partially in hardware of the computing device to display the status.

13. The system as described in claim 12, wherein the text is included in a metadata field of the asset and the display module is further configured to display the link among a plurality of links representing a respective metadata field, and, responsive to a user selection of one of the plurality of links, display metadata corresponding to the respective metadata field.

14. The system as described in claim 12, wherein the text frame includes a plurality of text fragments, each of the plurality of text fragments associated with a respective link that binds a respective representation of text and a respective asset location.

15. The system as described in claim 12, wherein the display module is configured to display a warning when the status is missing or modified.

16. The system as described in claim 15, wherein the warning includes an option to update the link.

17. In a digital medium environment to typeset documents, a method implemented by a computing device, the method comprising:
    a step for displaying a logical structure of a document, the logical structure having a plurality of nodes, each node corresponding to a respective text fragment of a text frame of the document;
    a step for receiving a modification to information in one of the nodes;
    a step for obtaining, responsive to the receiving, text of an asset, the text linked in the one of the nodes to a location of the asset by a link that binds a representation of the text to the location;
    a step for determining a status of the link including one of modified, missing, or up-to-date;
    a step for displaying the status; and
    a step for updating the document by inserting the text into the respective text fragment of the one of the nodes.

18. The method as described in claim 17, wherein the step for receiving the modification includes receiving the modification as a user edit to the logical structure.

19. The method as described in claim 17, further comprising:

displaying a layout of the document; and obtaining a user edit in the layout of the document, wherein receiving the modification is responsive to the obtaining the user edit.

20. The method as described in claim 17, wherein the text is included in a metadata field of the asset, and the one of the nodes links the metadata field to the location of the asset.

* * * * *